United States Patent
Zhang et al.

(10) Patent No.: US 12,154,196 B2
(45) Date of Patent: Nov. 26, 2024

(54) APPLYING OBJECT-AWARE STYLE TRANSFER TO DIGITAL IMAGES

(71) Applicant: Adobe Inc., San Jose, CA (US)

(72) Inventors: Zhifei Zhang, San Jose, CA (US); Zhe Lin, Fremont, CA (US); Scott Cohen, Sunnyvale, CA (US); Darshan Prasad, San Jose, CA (US); Zhihong Ding, Fremont, CA (US)

(73) Assignee: Adobe Inc., San Jose, CA (US)

( * ) Notice: Subject to any disclaimer, the term of this patent is extended or adjusted under 35 U.S.C. 154(b) by 28 days.

(21) Appl. No.: 17/810,392

(22) Filed: Jul. 1, 2022

(65) Prior Publication Data
US 2024/0005574 A1    Jan. 4, 2024

(51) Int. Cl.
*G06T 11/40*      (2006.01)
*G06T 5/77*      (2024.01)
*G06T 7/12*      (2017.01)

(52) U.S. Cl.
CPC .............. *G06T 11/40* (2013.01); *G06T 5/77* (2024.01); *G06T 7/12* (2017.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 11,636,639 B2* | 4/2023 | Adamson, III | ...... | G06V 10/764 345/629 |
| 2018/0103213 A1* | 4/2018 | Holzer | ................. | H04N 5/9201 |
| 2021/0217443 A1 | 7/2021 | Abraham | | |
| 2022/0108431 A1 | 4/2022 | Baran et al. | | |
| 2023/0082715 A1* | 3/2023 | Yu | .......................... | G06T 5/006 382/159 |
| 2023/0316641 A1* | 10/2023 | Raj | ........................ | G06T 17/00 345/419 |

FOREIGN PATENT DOCUMENTS

WO     2020/025000 A1     2/2020

OTHER PUBLICATIONS

Li, Chuan, and Michael Wand. "Precomputed real-time texture synthesis with markovian generative adversarial networks." Computer Vision—ECCV 2016: 14th European Conference, Amsterdam, The Netherlands, Oct. 11-14, 2016, Proceedings, Part III 14. Springer International Publishing, 2016.*

(Continued)

*Primary Examiner* — Ryan M Gray
(74) *Attorney, Agent, or Firm* — Keller Preece PLLC

(57) ABSTRACT

The present disclosure relates to systems, non-transitory computer-readable media, and methods for transferring global style features between digital images utilizing one or more machine learning models or neural networks. In particular, in one or more embodiments, the disclosed systems receive a request to transfer a global style from a source digital image to a target digital image, identify at least one target object within the target digital image, and transfer the global style from the source digital image to the target digital image while maintaining an object style of the at least one target object.

20 Claims, 12 Drawing Sheets

(56) References Cited

OTHER PUBLICATIONS

Castillo, Carlos, et al. "Son of zorn's lemma: Targeted style transfer using instance-aware semantic segmentation." 2017 IEEE International Conference on Acoustics, Speech and Signal Processing (ICASSP). IEEE, 2017.*

Kohli, Puneet, et al. "GPU-Accelerated Mobile Multi-view Style Transfer." arXiv preprint arXiv:2003.00706 (2020).*

Yang, Chao, et al. "High-resolution image inpainting using multi-scale neural patch synthesis." Proceedings of the IEEE conference on computer vision and pattern recognition. 2017.*

Balakrishnan, Guha, et al. "Synthesizing images of humans in unseen poses." Proceedings of the IEEE conference on computer vision and pattern recognition. 2018.*

Gatys, Leon A., Alexander S. Ecker, and Matthias Bethge. "Image style transfer using convolutional neural networks." Proceedings of the IEEE conference on computer vision and pattern recognition. 2016.*

Johnson, Justin, Alexandre Alahi, and Li Fei-Fei. "Perceptual losses for real-time style transfer and super-resolution." Computer Vision—ECCV 2016: 14th European Conference, Amsterdam, The Netherlands, Oct. 11-14, 2016, Proceedings, Part II 14. Springer International Publishing, 2016.*

Virtusio, John Jethro, et al. "Neural style palette: A multimodal and interactive style transfer from a single style image." IEEE Transactions on Multimedia 23 (2021): 2245-2258.*

Reimann, Max, et al. "Locally controllable neural style transfer on mobile devices." The Visual Computer 35.11 (2019): 1531-1547.*

Xia, Xide, et al. "Real-time localized photorealistic video style transfer." Proceedings of the IEEE/CVF Winter Conference on Applications of Computer Vision. 2021.*

Reimann, Max, et al. "MaeSTrO: A mobile app for style transfer orchestration using neural networks." 2018 International Conference on Cyberworlds (CW). IEEE, 2018.*

Kurzman, Lironne, David Vazquez, and Issam Laradji. "Class-based styling: Real-time localized style transfer with semantic segmentation." Proceedings of the IEEE/CVF International Conference on Computer Vision Workshops. 2019.*

Zhu, Ting, and Shiguang Liu. "Detail-preserving arbitrary style transfer." 2020 IEEE International conference on multimedia and expo (ICME). IEEE, 2020.*

Park, Taesung, Jun-Yan Zhu, Oliver Wang, Jingwan Lu, Eli Shechtman, Alexei A. Efros, and Richard Zhang. "Swapping autoencoder for deep image manipulation." arXiv preprint arXiv:2007.00653 (2020).

Yoo, Jaejun, Youngjung Uh, Sanghyuk Chun, Byeongkyu Kang, and Jung-Woo Ha. "Photorealistic style transfer via wavelet transforms." In Proceedings of the IEEE/CVF International Conference on Computer Vision, pp. 9036-9045. 2019.

Search and Examination Report as received in GB application 2305010.7 dated Nov. 15, 2023.

* cited by examiner

APPLYING OBJECT-AWARE STYLE TRANSFER TO DIGITAL IMAGES

BACKGROUND

Recent years have seen significant improvements in digital graphics tools for creating or modifying digital content. In particular, individuals and businesses increasingly utilize digital graphics tools to edit images. Indeed, with increased availability of mobile devices having built-in cameras, many individuals and businesses produce digital images and utilize digital graphics tools to edit those digital images. For instance, digital graphics tools are often used to edit digital images by transferring global features, such as textures and styles, from one digital image to another. Unfortunately, many conventional texture transferring systems that transfer global features between digital images have a number of shortcomings with regard to accuracy, efficiency, and flexibility.

BRIEF SUMMARY

Embodiments of the present disclosure solve one or more of the foregoing or other problems in the art with systems, non-transitory computer-readable media, and methods for performing object-aware texture transfer. In particular, the disclosed systems modify digital images by transferring global features of a source digital image to the target digital image in an object aware manner. For example, embodiments of the present disclosure apply a global style to a digital image while maintaining a style of one or more objects in the digital image.

In one or more implementations, the disclosed systems and methods utilize various methods and/or machine learning models to perform the object aware texture transfer. For example, the disclosed systems and methods utilize machine learning models to perform object detection and/or segmentation, background inpainting, texture transfer, and foreground harmonization to generate robust, photo-realistic modified digital images. In this manner, the disclosed systems allow for accurate, efficient, and flexible transference of global style features between digital images and eliminate the need for post-process editing by intelligently avoiding transference of global style features to certain objects within the input digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
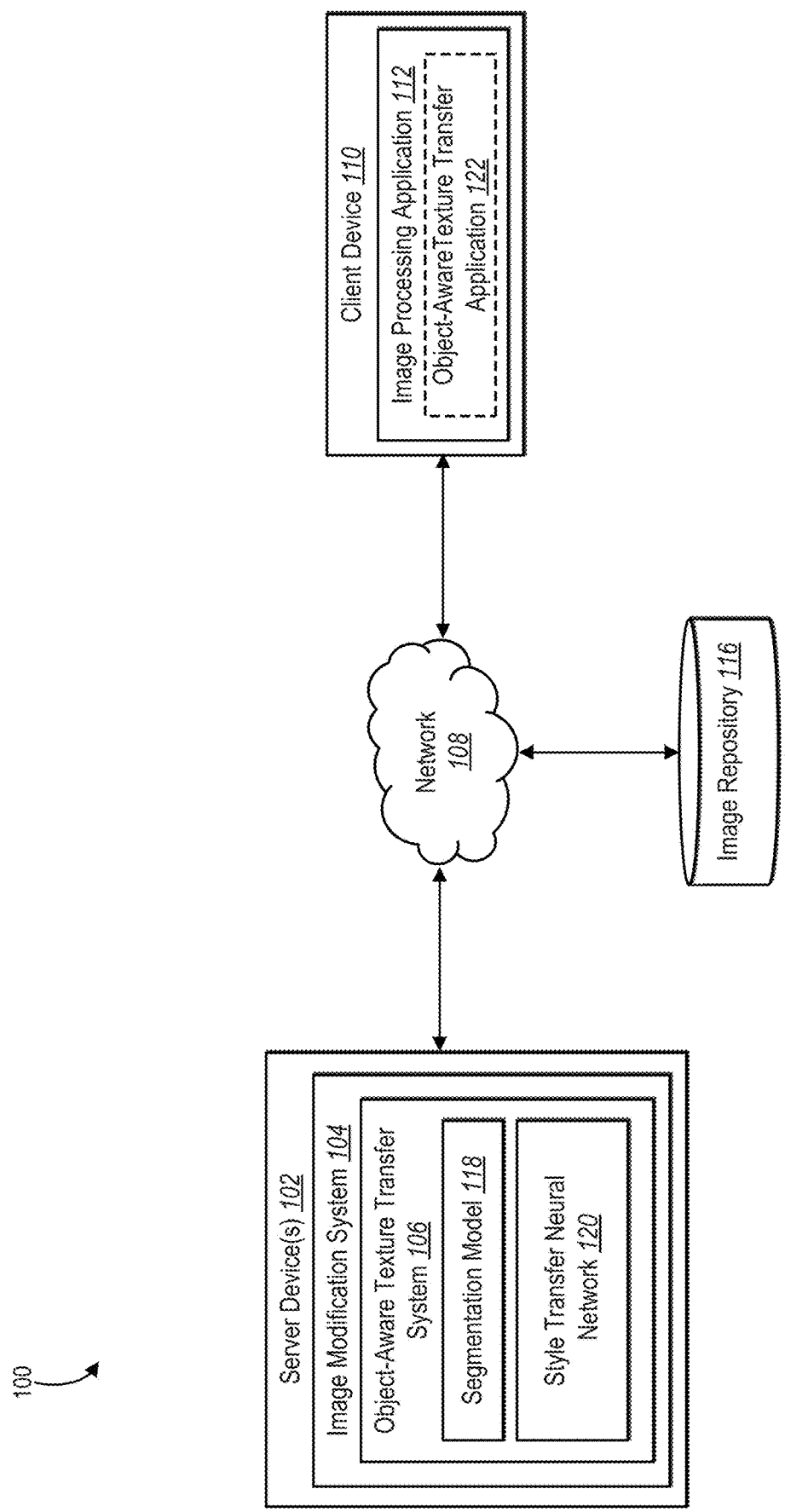
FIG. 1 illustrates a diagram of an environment in which an object-aware texture transfer system operates in accordance with one or more embodiments.

This disclosure describes one or more embodiments of an object-aware texture transfer system that utilizes a sequence of methods and/or machine learning models to transfer global style features from a source digital image to a target digital image. More specifically, in one or more implementations, the object-aware texture transfer system implements transference of global style features between source and target digital images without inadvertent alteration of portrayed object for which global style features do not apply, such as cars, animals, persons, and so forth. For example, in one or more embodiments, the object-aware texture transfer system utilizes a pipeline of procedures and/or models comprising object detection and/or segmentation, background inpainting, texture transfer, and composite image harmonization to generate a modified digital image incorporating global style features from the source digital image while maintaining spatial features and applicable object textures within the target digital image.

To further illustrate, in one or more embodiments, the object-aware texture transfer system identifies one or more object within a target digital image whose style or texture should be preserved after texture transfer from a source digital image. In one or more embodiments, the object-aware texture transfer system identifies the one or more objects utilizing an object detection model, such as a machine learning model or neural network, as described in further detail below. In response to identifying the one or more objects, the object-aware texture transfer system transfers a global style from the source digital image to the target digital image while maintaining the style or texture of the one or more objects (i.e., without transferring the global style to the one or more objects).

For example, in some embodiments, the object-aware texture transfer system maintains the appearance of the one or more objects by extracting the object(s) prior to transferring the global style from the source digital image. In one or more embodiments, the object-aware texture transfer system extracts the one or more objects utilizing an object segmentation model, such as a machine learning model or neural network, as described in further detail below. In response to extracting the object(s) then transferring the global style, the object-aware texture transfer system reinserts the one or more objects into the image with the transferred global style and, in some embodiments, harmonizes the one or more objects with the background proximate the one or more objects. In one or more embodiments, the object-aware texture transfer system harmonizes the one or more objects utilizing a harmonization model, such as a machine learning model or neural network, as described in further detail below.

Moreover, in some embodiments, in response to extracting the one or more objects from the target digital image, the object-aware texture transfer system fills one or more holes left by the one or more objects utilizing an inpainting model, such as a machine learning model or neural network, as described in further detail below. Also, in one or more embodiments, the object-aware texture transfer system identifies one or more additional objects in the source digital image, extracts the one or more additional objects, fills one or more holes left by the extracted object(s), then transfers the global style. By extracting objects from the source digital image, the object-aware texture transfer system improves the accuracy and robustness of texture transfer, particularly when the subject digital images portray complex scenes or landscapes.

In one or more implementations, the disclosed object-aware texture transfer system provides a variety of advantages and benefits over conventional systems and methods for transferring textures between digital images. For instance, as mentioned above, the object-aware texture transfer system improves the accuracy and fidelity of modified digital images by preserving spatial and style features of objects portrayed within target digital images. Furthermore, by removing objects from source digital images prior to transferring global style features therefrom, the object-aware texture transfer system improves the accuracy and efficiency of generating modified digital images, such that less computation resources are required to extract and transfer the global style features from the source digital images to the target digital images.

Additionally, the object-aware texture transfer system provides increased flexibility over conventional systems by controlling the extent to which the texture is, or is not, transferred between the images during the texture transfer process. For instance, in one or more implementations, the object-aware texture transfer system identifies one or more objects within a target digital image and transfers a global style (e.g., a landscape texture) from a source digital image to the target digital image without altering a style or texture of the one or more identified objects. In particular, the object-aware texture transfer system utilizes object segmentation and/or other methods disclosed herein to ensure that texture is not transferred to an object or objects within the target digital image. By implementing object-aware style transfer between source and target digital images, the object-aware texture transfer system generates robust, photo-realistic modified digital images from arbitrary source and target digital images.

Turning now to the figures, FIG. 1 illustrates a schematic diagram of one embodiment of a system 100 (or environment) in which an object-aware texture transfer system 106 operates in accordance with one or more embodiments. As illustrated, the system 100 includes server device(s) 102, a network 108, a client device 110, and an image repository 116. As further illustrated, the server device(s) 102, the client device 110, and the image repository 116 communicate with one another via the network 108.

As shown in FIG. 1, the server device(s) 102 include an image modification system 104 that further includes the object-aware texture transfer system 106. For instance, the server device(s) 102 includes, but is not limited to, a computing device (such as explained below in reference to FIG. 12). In some embodiments, the object-aware texture transfer system 106 utilizes a segmentation model 118 in conjunction with a style transfer neural network 120 to generate modified digital images with content-aware texture transfer, as further disclosed below.

In some instances, the object-aware texture transfer system 106 receives a request to transfer global style features of a source digital image to a target digital image from the client device 110. In response, the object-aware texture transfer system 106 extracts at least one object from the source and/or target digital image using the segmentation model 118 and performs the global style transfer in latent space by using the style transfer neural network 120 to generate a modified digital image comprising the spatial features of the target digital image with the global style features of the source digital image, while maintaining the spatial and style features of the extracted object(s).

As mentioned, the object-aware texture transfer system 106 transfers a global style (e.g., a general texture) from a source image to a target image. An image (sometimes referred to as digital image) refers to a digital symbol, picture, icon, and/or other visual illustration depicting one or more objects. For instance, an image includes a digital file having a visual illustration and/or depiction of a person with a hairstyle (e.g., a portrait image) or wrinkles. Indeed, in some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Moreover, a feature refers to digital information describing all or part of a digital image. Features are represented as vectors, tensors, or codes (e.g., latent codes) that the object-aware texture transfer system 106 generates by extracting features utilizing the global and spatial autoencoder. Features optionally include observable characteristics or observable information pertaining to a digital image such as a color or a geometric layout. Additionally (or alternatively), features include latent features (e.g., features within the various layers of a neural network and that may change as they are passed from layer to layer) and/or unobservable deep features generated by a global and spatial autoencoder.

Relatedly, spatial feature refers to a feature corresponding to the geometric layout of a digital image. The object-aware texture transfer system 106 extracts spatial features from a digital image to represent the geometric layout of the digital image—i.e., the spatial structure, the relative positioning, and/or the arrangement of various objects or portions of the digital image. Indeed, the object-aware texture transfer system 106 extracts a "spatial code" that includes multiple spatial features and that describes the geometric layout of a digital image as a whole. A spatial code includes a vector or a tensor of latent features that, though not necessarily discernable by a human observer, are interpretable by the global and spatial autoencoder to describe the geometric layout of a digital image.

Along similar lines, global feature and style feature refer to a feature corresponding to overall image properties or an overall appearance of a digital image. To elaborate, a global feature represents an aesthetic of a digital image including a texture, a style, an illumination, a color scheme, a shading, and/or a perspective of a digital image. Indeed, the object-aware texture transfer system 106 extracts a "global code" that includes multiple global features and that describes the overall image properties or the overall appearance of a digital image as a whole. A global code includes a vector or a tensor of latent features that are not necessarily discernable by a human observer, but that are interpretable by the global and spatial autoencoder to describe the overall appearance of a digital image.

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below in reference to FIG. 12. Although not shown in FIG. 1, some embodiments of client device 110 are operated by a user to perform a variety of functions via an image modification application 112. For example, the client device 110 (through the image modification application 112 and the object-aware texture transfer application 122) performs functions such as, but not limited to, transferring global styles between digital images. In addition, in some embodiments, the client device 110 also receives modified versions of digital images (e.g., target digital images modified by transferring global style features of a source digital image thereto) from the object-aware texture transfer system 106.

To access the functionalities of the object-aware texture transfer system 106 (as described above and in greater detail below), in one or more embodiments, a user interacts with the image modification application 112 on the client device 110. For example, the image modification application 112 includes one or more software applications (e.g., to interact with and/or modify images in accordance with one or more embodiments herein) installed on the client device 110, such as object-aware texture transfer application 122. In certain instances, the image modification application 112 is hosted on the server device(s) 102. Additionally, when hosted on the server device(s) 102, the image modification application 112 is accessed by the client device 110 through a web browser and/or another online interfacing platform and/or tool.

Although FIG. 1 illustrates the object-aware texture transfer system 106 being implemented by a particular component and/or device within the system 100 (e.g., the server device(s) 102), in some embodiments the object-aware texture transfer system 106 is implemented, in whole or part, by other computing devices and/or components in the system 100. For instance, in some embodiments, the object-aware texture transfer system 106 is implemented on the client device 110 within the object-aware texture transfer application 122. More specifically, in one or more embodiments, the description of (and acts performed by) the object-aware texture transfer system 106 are implemented (or performed by) the object-aware texture transfer application 122 when the client device 110 implements the object-aware texture transfer system 106. In particular, in some embodiments, the client device 110 (via an implementation of the object-aware texture transfer application 122) utilizes segmentation model 118 and style transfer neural network 120 to generated modified digital images having global style features transferred from a source digital image to a target digital image while maintaining an object style of at least one object within the target digital image.

In some embodiments, the server device(s) 102 trains one or more machine-learning models described herein. For example, the object-aware texture transfer system 106 on the server device(s) 102 provides the one or more trained machine-learning models to the object-aware texture transfer application 122 on the client device 110 for implementation. In other words, the client device 110 obtains (e.g., downloads) the machine-learning models from the server device(s) 102. At this point, the client device 110 may utilize the machine-learning models to generate modified digital images independent from the server device(s) 102.

In some embodiments, the object-aware texture transfer application 122 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image). In response, the object-aware texture transfer system 106 on the server device(s) 102 performs operations described herein to generate a modified digital image. The server device(s) 102 then provides the output or results of the operations (e.g., a modified digital image) to the client device 110.

As further shown in FIG. 1, the system 100 includes the image repository 116. In one or more embodiments, the image repository 116 includes, but is not limited to, a server device, a cloud service computing device, or any other type of computing device (including those explained below with reference to FIG. 12) that stores one or more digital images. In some embodiments, the object-aware texture transfer system 106 accesses the image repository 116 to retrieve one or more digital images. For example, the object-aware texture transfer system 106 utilizes images from the image repository 116 to transfer global style features between digital images using the style transfer neural network 120 while maintaining an object style of at least one object within the digital images using the segmentation network 118. In some instances, the object-aware texture transfer system 106 performs the above-mentioned tasks upon receiving a request from the client device 110 to utilize digital images from the image repository 116.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 12. Furthermore, although FIG. 1 illustrates the server device(s) 102, the client devices 110, and the image repository 116 communicating via the network 108, in certain embodiments, the various components of the system 100 communicate and/or interact via other methods (e.g., the server device(s) 102 and the client device 110 communicating directly).

As discussed above, in one or more embodiments, the object-aware texture transfer system 106 combines latent codes of digital images to transfer global style features between a source digital image and a target digital image. In particular, the object-aware texture transfer system 106 uses the style transfer neural network 120 to generate a combined latent encoding for generating a digital image having a global style of the source digital image with spatial features of the target digital image.

A neural network refers to a machine learning model that is tunable (e.g., trained) based on inputs to approximate unknown functions. In particular, a neural network includes a model of interconnected neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network), a generative adversarial neural network (GAN), or another multi-layer neural network. In some embodiments, a neural network includes a combination of neural networks or neural network components.

Figure 2:
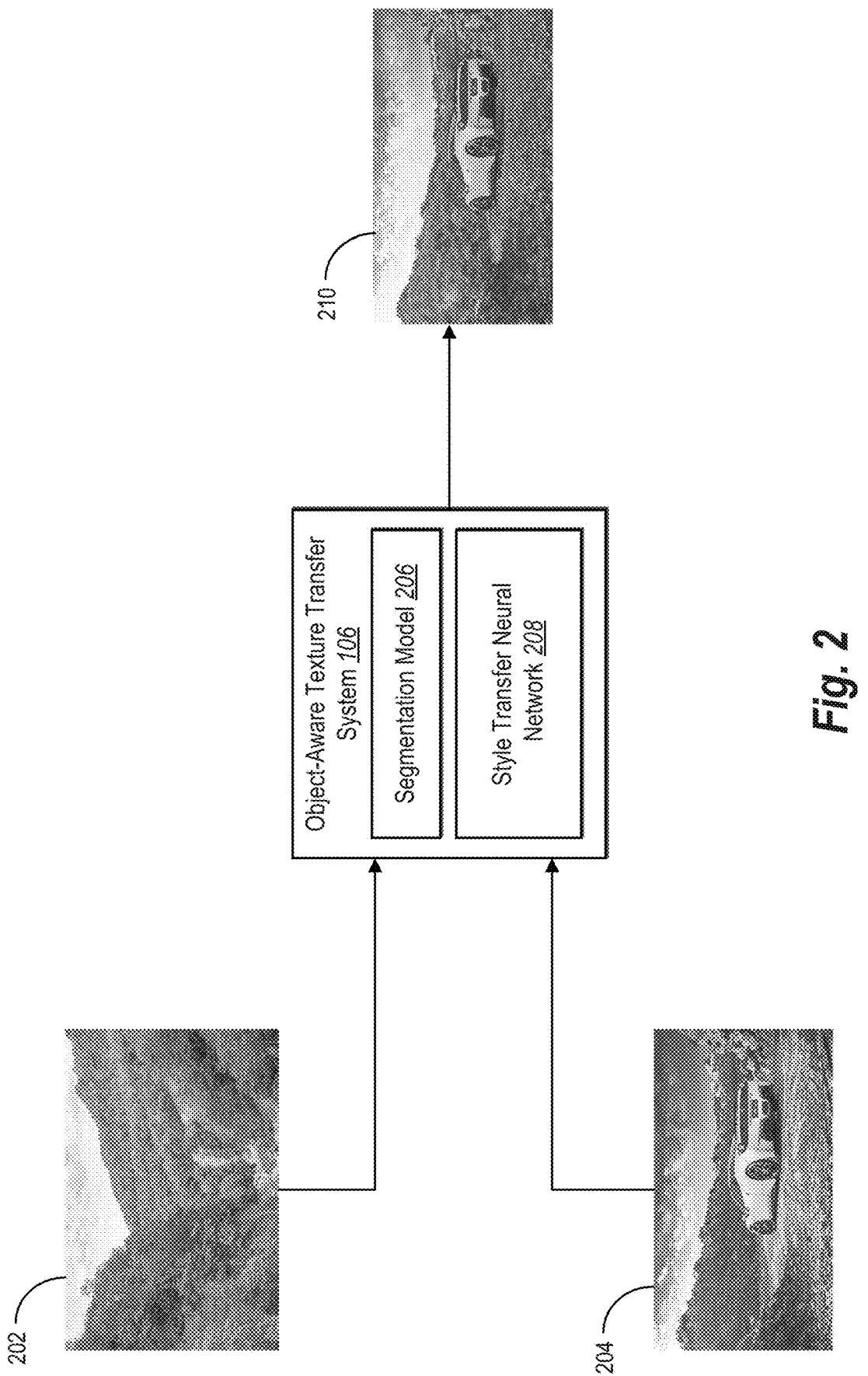
FIG. 2 illustrates an overview of an object-aware texture transfer system generating a modified digital image in accordance with one or more embodiments.

As shown in FIG. 2, the object-aware texture transfer system 106 identifies (or receives) a source digital image 202 depicting a landscape with a global style (in the example shown, a densely vegetated mountain landscape), and identifies (or receives) a target digital image 204 depicting a landscape and an object (in the example shown, a car). In response, the object-aware texture transfer system 106 generates a modified digital image 210 from the source digital image 202 and the target digital image 204, in accordance with one or more embodiments disclosed herein. Indeed, as illustrated in FIG. 2, the object-aware texture transfer system 106 generates a modified digital image 210 that depicts the landscape of the target digital image 204 with the global style of the source digital image 202 while maintaining the object style of the object (i.e., the car) from the target digital image 204.

As further illustrated in FIG. 2, the object-aware texture transfer system 106 allows a user to select a source digital image 202 depicting a particular global style (e.g., a landscape texture). In accordance with one or more embodiments disclosed herein, the illustrated object-aware texture transfer system 106 utilizes a segmentation model 206 to extract the object (i.e., the car) from the target digital image 204 prior to transferring the global style of the source digital image 202 thereto using a style transfer neural network 208. In some embodiments, for example, the object-aware texture transfer system 106 utilizes the segmentation model 206 to generate a first intermediate digital image by extracting the object (i.e., the car) from the target digital image 204. In response, the object-aware texture transfer system 106 utilizes the style transfer neural network 208 to transfer the global style (i.e., the landscape texture) from the source digital image 202 to the first intermediate digital image to generate a second intermediate digital image. Ultimately, the object-aware texture transfer system 106 generates the modified digital image 210 by reinserting the object (i.e., the car) into the second intermediate digital image.

Figure 3:
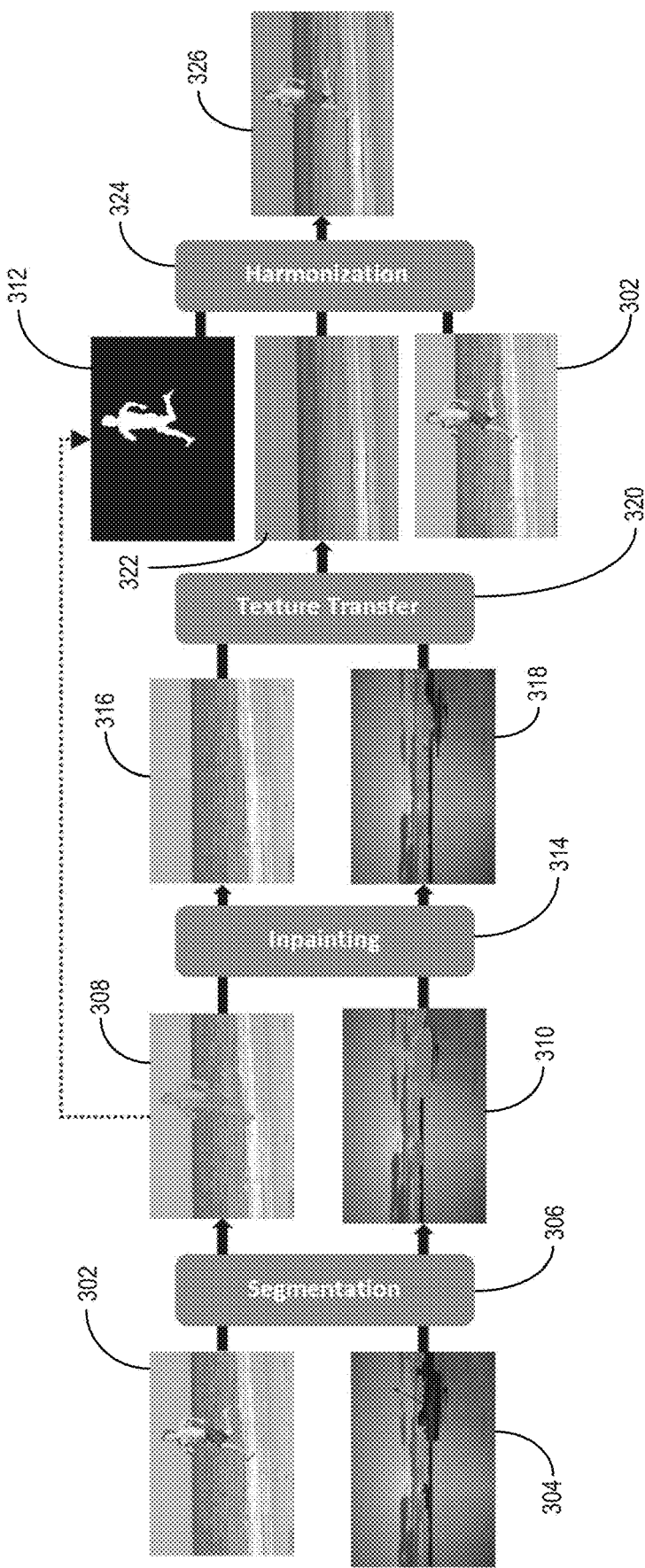
FIG. 3 illustrates a texture transfer pipeline for performing object aware texture transfer utilizing a sequence of image modification methods and/or machine learning models in accordance with one or more embodiments.

As mentioned above, in one or more embodiments, the object-aware texture transfer system 106 utilizes various methods and/or models to transfer global style features between source and target digital images while maintaining an object style of at least one object within the target digital image. For example, FIG. 3 illustrates the object-aware texture transfer system 106 generating a modified digital image 326 by transferring global style features from a source digital image 304 to a target digital image 302 utilizing techniques comprising segmentation 306, inpainting 314, texture transfer 320, and harmonization 324. Also, in some embodiments, the object-aware texture transfer system 106 utilizes object detection (e.g., by user selection and/or by an object detection machine learning model as described below in relation to FIG. 4) to identify objects for which object styles are to be maintained during transference of global style features. Indeed, the object-aware texture transfer system 106 may include less or more features than the embodiment illustrated.

As shown in FIG. 3, the object-aware texture transfer system 106 performs segmentation 306 to extract objects from the target digital image 302 and the source digital image 304 to generate a first intermediate target digital image 308 and a first intermediate source digital image 310. In one or more embodiments, the object-aware texture transfer system 106 utilizes a segmentation machine learning model or neural network, such as but not limited to the object segmentation machine learning model described below in relation to FIG. 4. By utilizing segmentation 306 to extract objects from the target digital image 302 and/or the source digital image 304 prior to texture transfer 320, the object-aware texture transfer system 106 improves the efficiency and accuracy of transference of global styles between the target digital image 302 and the source digital image 304.

Further, in some embodiments, the object-aware texture transfer system 106 utilizes inpainting 314 to fill holes corresponding the objects extracted by segmentation 306. For instance, as shown in FIG. 3, the object-aware texture transfer system 106 utilizes inpainting 314 to fill a hole in the first intermediate target digital image 308 to generate a second intermediate target digital image 316. As also shown, in some implementations the object-aware texture transfer system 106 utilizes inpainting 314 to fill a hole in the first intermediate source digital image 310 to generate a second intermediate source digital image 318. In one or more embodiments, the object-aware texture transfer system 106 utilizes an inpainting machine learning model or neural network, such as but not limited to the content aware fill machine learning model described below in relation to FIG. 5. By inpainting 314 prior to texture transfer 320, the object-aware texture transfer system 106 further improves the efficiency and accuracy of transference of global styles between the target digital image 302 and the source digital image 304.

As further illustrated in FIG. 3, the object-aware texture transfer system 106 generates an intermediate modified digital image 322 by transferring global style features from the second intermediate source digital image 318 to the second intermediate target digital image 316. For example, as described in greater detail below in relation to FIG. 6, in one or more embodiments, the object-aware texture transfer system 106 generates the intermediate modified digital image 322 by combining a global code corresponding to the second intermediate source digital image 318 with a spatial code corresponding to the second intermediate target digital image 316. In one or more embodiments, the object-aware texture transfer system 106 utilizes a style transfer machine learning model or neural network, such as but not limited to the style transfer neural network described below in relation to FIG. 6.

Moreover, as shown in FIG. 3, the object-aware texture transfer system 106 generates a modified digital image 326 by reinserting the extracted object from the target digital image 302 into the intermediate modified digital image 322. Further, as illustrated, the object-aware texture transfer system 106 performs harmonization 324 to harmonize the extracted object with a background portion of the intermediate modified digital image 322. For example, in some embodiments, the object-aware texture transfer system 106 utilizes an object mask 312 generated during segmentation 306 to harmonize the extracted object with the background portion of the underlying image. In some embodiments, the object-aware texture transfer system 106 utilizes a harmonization machine learning model or neural network, such as but not limited to the harmonization neural network described below in relation to FIGS. 7-8. Indeed, as shown in FIG. 3, the final modified digital image 326 comprises spatial features of the target digital image 302, including the extracted object (i.e., the running man), and the global style features of the source digital image 304 in a realistic image exhibiting high fidelity to the original images.

Figure 4:
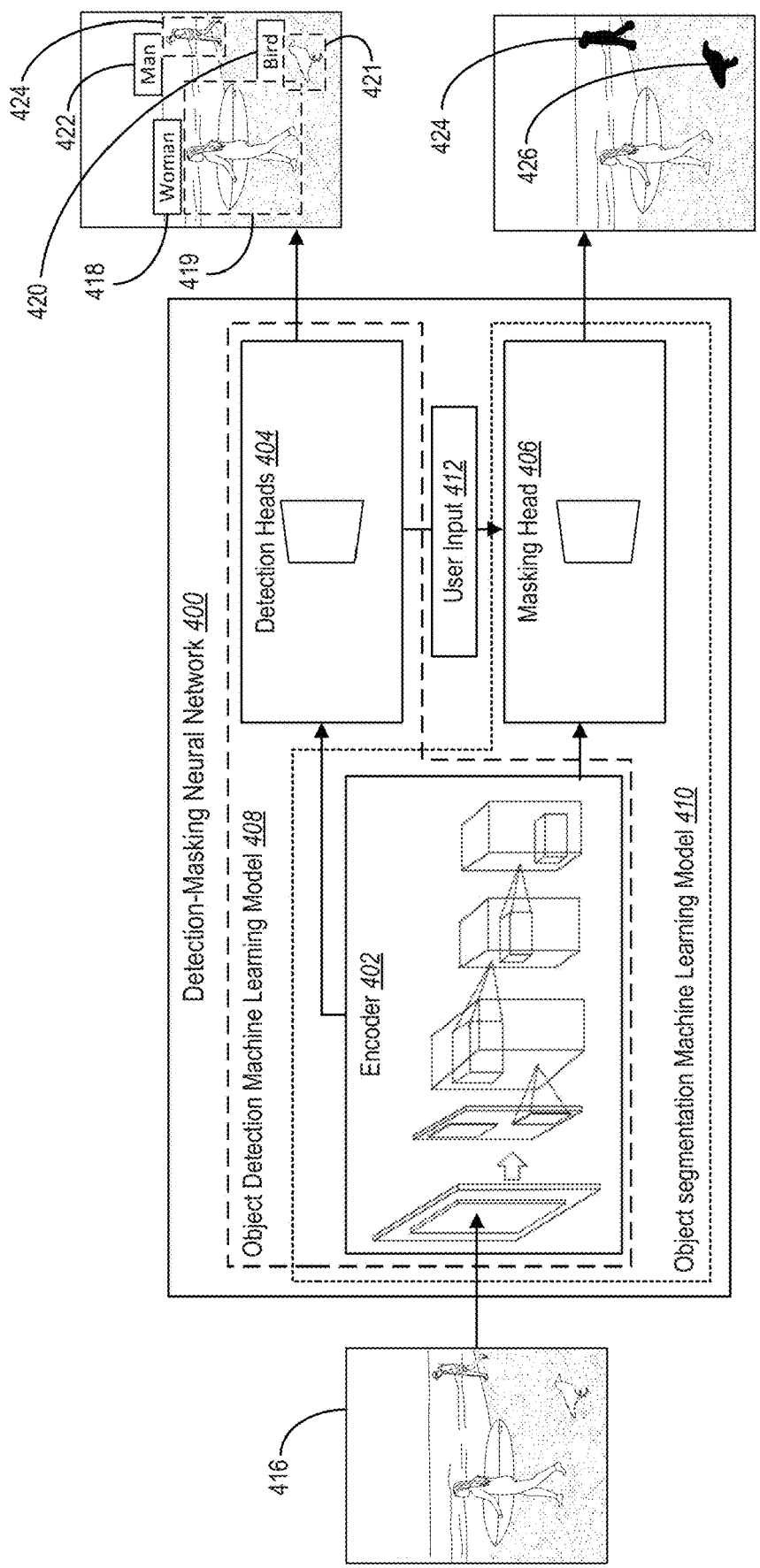
FIG. 4 illustrates an object-aware texture transfer system utilizing one or more machine learning models to identify and segment one or more objects in a digital image in accordance with one or more embodiments.

As mentioned above, in one or more embodiments, the object-aware texture transfer system 106 uses an object detection machine learning model to detect objects within target and/or source digital images. Specifically, FIG. 4 illustrates one example of an object detection machine learning model that the object-aware texture transfer system 106 utilizes in one or more implementations to detect objects within a digital image 416. Specifically, FIG. 4 illustrates a detection-masking neural network 400 that comprises both an object detection machine learning model 408 (in the form of an object detection neural network) and an object segmentation machine learning model 410 (in the form of an object segmentation neural network). Specifically, the detection-masking neural network 400 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference.

Although FIG. 4 illustrates the object-aware texture transfer system 106 utilizing the detection-masking neural network 400, in one or more implementations, the object-aware texture transfer system 106 utilizes different machine learning models to detect objects, generate object masks for objects, and/or extract objects. For instance, in one or more implementations, the object-aware texture transfer system 106 utilizes, as the object detection machine learning model, one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., Faster r-cnn: Towards real-time object detection with region proposal networks, NIPS, 2015; or Redmon, et al., You Only Look Once: Unified, Real-Time Object Detection, CVPR 2016, the contents of each of the foregoing applications and papers are hereby incorporated by reference in their entirety.

Similarly, in one or more implementations, the object-aware texture transfer system 106 utilizes, as the object segmentation machine learning model, one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

Returning now to FIG. 4, in one or more implementations, the object-aware texture transfer system 106 utilizes a detection-masking neural network 400 that includes a neural network encoder 402 having a backbone network, detection heads 404 (or neural network decoder head), and a masking head 406 (or neural network decoder head). As shown in FIG. 4, the encoder 402 encodes the digital image 416 and provides the encodings to the detection heads 404 and the masking head 406. The detection heads 404 utilize the encodings to detect one or more digital objects portrayed within the digital image 416. The masking head 406 generates at least one object mask for the detected objects.

As just mentioned, the detection-masking neural network 400 utilizes both the object detection machine learning model 408 and the object segmentation machine learning model 410. In one or more implementations, the object detection machine learning model 408 includes both the encoder 402 and the detection heads 404 shown in FIG. 4. While the object segmentation machine learning model 410 includes both the encoder 402 and the masking head 406.

Furthermore, the object detection machine learning model 408 and the object segmentation machine learning model 410 are separate machine learning models for processing objects within target and/or source digital images. FIG. 4 illustrates the encoder 402, detection heads 404, and the masking head 406 as a single model for detecting and segmenting objects of a frame within an image stream. For efficiency purposes, in some embodiments the object-aware texture transfer system 106 utilizes the network illustrated in FIG. 4 as a single network. The collective network (i.e., the object detection machine learning model 408 and the object segmentation machine learning model 410) is referred to as the detection-masking neural network 400. The following paragraphs describe components relating to the object detection machine learning model 408 of the network (such as the detection heads 404) and transitions to discussing components relating to the object segmentation machine learning model 410.

As just mentioned, in one or more embodiments, the object-aware texture transfer system 106 utilizes the object detection machine learning model 408 to detect and identify objects within a digital image 416 (e.g., a target or a source digital image). FIG. 4 illustrates one implementation of an object detection machine learning model 408 that the object-aware texture transfer system 106 utilizes in accordance with at least one embodiment. In particular, FIG. 4 illustrates an object detection machine learning model 408 utilized by the object-aware texture transfer system 106 to detect objects. In one or more embodiments, the object detection machine learning model 408 comprises a deep learning convolutional neural network (CNN). For example, in some embodiments, the object detection machine learning model 408 comprises a region-based (R-CNN).

As shown in FIG. 4, the object detection machine learning model 408 includes lower neural network layers and higher neural network layers. In general, the lower neural network layers collectively form the encoder 402 and the higher neural network layers collectively form the detection heads 404 (e.g., decoder). In one or more embodiments, the encoder 402 includes convolutional layers that encodes frames of an image stream into feature vectors, which are outputted from the encoder 402 and provided as input to the detection heads 404. In various implementations, the detection heads 404 comprise fully connected layers that analyze the feature vectors and output the detected objects (potentially with approximate boundaries around the objects).

In particular, the encoder 402, in one or more implementations, comprises convolutional layers that generate a feature vector in the form of a feature map. To detect objects within the digital image 416, the object detection machine learning model 408 processes the feature map utilizing a convolutional layer in the form of a small network that is slid across small windows of the feature map. The object detection machine learning model 408 then maps each sliding window to a lower-dimensional feature. The object detection machine learning model 408 then processes this feature using two separate detection heads that are fully connected layers. In particular, the first head comprises a box-regression layer that generates the detected object and an object-classification layer that generates the object label.

As shown by FIG. 4, the output from the detection heads 404 shows object labels above each of the detected objects. For example, the detection-masking neural network 400, in response to detecting objects, assigns an object label to each of the detected objects. In particular, as previously discussed, the detection-masking neural network 400 utilizes object labels based on classifications of the objects. To illustrate, FIG. 4 shows a label 418 for woman, a label 420 for man, and a label 422 for bird.

As mentioned, the object detection machine learning model 408 detects the objects within the digital image 316. In some embodiments, and as illustrated in FIG. 4, the detection-masking neural network 400 indicates the detected objects utilizing approximate boundaries (e.g., bounding boxes 419, 421, and 423). For example, each of the bounding boxes comprises an area that encompasses an object. In some embodiments, the detection-masking neural network 400 annotates the bounding boxes with the previously mentioned object labels such as the name of the detected object, the coordinates of the bounding box, and/or the dimension of the bounding box.

As illustrated in FIG. 4, the object detection machine learning model 408 detects several objects for the digital image 416. In some instances, the detection-masking neural network 400 identifies all objects within the bounding boxes. For example, the bounding boxes comprise the approximate boundary area indicating the detected object. An approximate boundary refers to an indication of an area including an object that is larger and/or less accurate than an object mask. In one or more embodiments, an approximate boundary includes at least a portion of a detected object and portions of the digital image 416 not comprising the detected object. An approximate boundary includes any shape, such as a square, rectangle, circle, oval, or other outline surrounding an object. In one or more embodiments, an approximate boundary comprises a bounding box.

Upon detecting the objects in the digital image 416, the detection-masking neural network 400 generates object masks for the detected objects. Generally, instead of utilizing coarse bounding boxes during object localization, the detection-masking neural network 400 generates segmentations masks that better define the boundaries of the object.

The following paragraphs provide additional detail with respect to generating object masks for detected objects in accordance with one or more embodiments. In particular, FIG. 4 illustrates the object-aware texture transfer system 106 utilizing the object segmentation machine learning model 410 to generate segmented objects in accordance with some embodiments.

As illustrated in FIG. 4, the object-aware texture transfer system 106 processes a detected object in a bounding box utilizing an object segmentation machine learning model 410 to generate an object mask, such as object mask 424 and object mask 426. In alternative embodiments, the object-aware texture transfer system 106 utilizes the object detection machine learning model 408 itself to generate an object mask of the detected object (e.g., segment the object for selection).

In one or more implementations, prior to generating an object mask of a detected object, object-aware texture transfer system 106 receives user input 412 to determine objects for which to generate object masks. For example, the object-aware texture transfer system 106 receives input from a user indicating a selection of one of the detected objects. To illustrate, in the implementation shown, the object-aware texture transfer system 106 receives user input 412 of the user selecting bounding boxes 421 and 423.

As mentioned, the object-aware texture transfer system 106 processes the bounding boxes of the detected objects in the digital image 416 utilizing the object segmentation machine learning model 410. In some embodiments, the bounding box comprises the output from the object detection machine learning model 408. For example, as illustrated in FIG. 4, the bounding box comprises a rectangular border about the object. Specifically, FIG. 4 shows bounding boxes 419, 421 and 423 which surround the woman, the bird, and the man detected in the digital image 416.

In some embodiments, the object-aware texture transfer system 106 utilizes the object segmentation machine learning model 410 to generate the object masks for the aforementioned detected objects within the bounding boxes. For example, the object segmentation machine learning model 410 corresponds to one or more deep neural networks or models that select an object based on bounding box parameters corresponding to the object within the digital image 416. In particular, the object segmentation machine learning model 410 generates object masks 424 and 426 for the detected man and bird.

In some embodiments, the object-aware texture transfer system 106 selects the object segmentation machine learning model 410 based on the object labels of the object identified by the object detection machine learning model 408. Generally, based on identifying one or more classes of objects associated with the input bounding boxes, the object-aware texture transfer system 106 selects an object segmentation machine learning model tuned to generate object masks for objects of the identified one or more classes. To illustrate, in some embodiments, based on determining that the class of one or more of the identified objects comprises a human or person, the object-aware texture transfer system 106 utilizes a special human object mask neural network to generate an object mask such as object mask 424 shown in FIG. 4.

As further illustrated in FIG. 4, the object-aware texture transfer system 106 receives the object masks 424 and 426 as output from the object segmentation machine learning model 410. Generally, an object mask comprises a pixel-wise mask that corresponds to an object in a source or target digital image. In one example, the object mask includes a segmentation boundary indicating a predicted edge of one or more objects as well as pixels contained within the predicted edge.

In some embodiments, the object-aware texture transfer system 106 also detects the objects shown in the digital image 416 via the collective network, i.e., the detection-masking neural network 400, in the same manner outlined above. For example, the image capturing system via the detection-masking neural network 400 detects the woman, the man, and the bird within the digital image 416 of the digital image 416. In particular, the object-aware texture transfer system 106 via the detection heads 404 utilizes the feature pyramids and feature maps to identify objects within the digital image 416 and based on user input 412 generates object masks via the masking head 406.

Furthermore, in one or more implementations, although FIG. 4 illustrates generating object masks based on the user input 412, the object-aware texture transfer system 106 generates object masks without user input 412. In particular, the object-aware texture transfer system 106 generates object masks for all detected objects within the digital image 416. To illustrate, despite receiving no user input 412, the object-aware texture transfer system 106 generates object masks for the woman, the man, and the bird.

Figure 5:
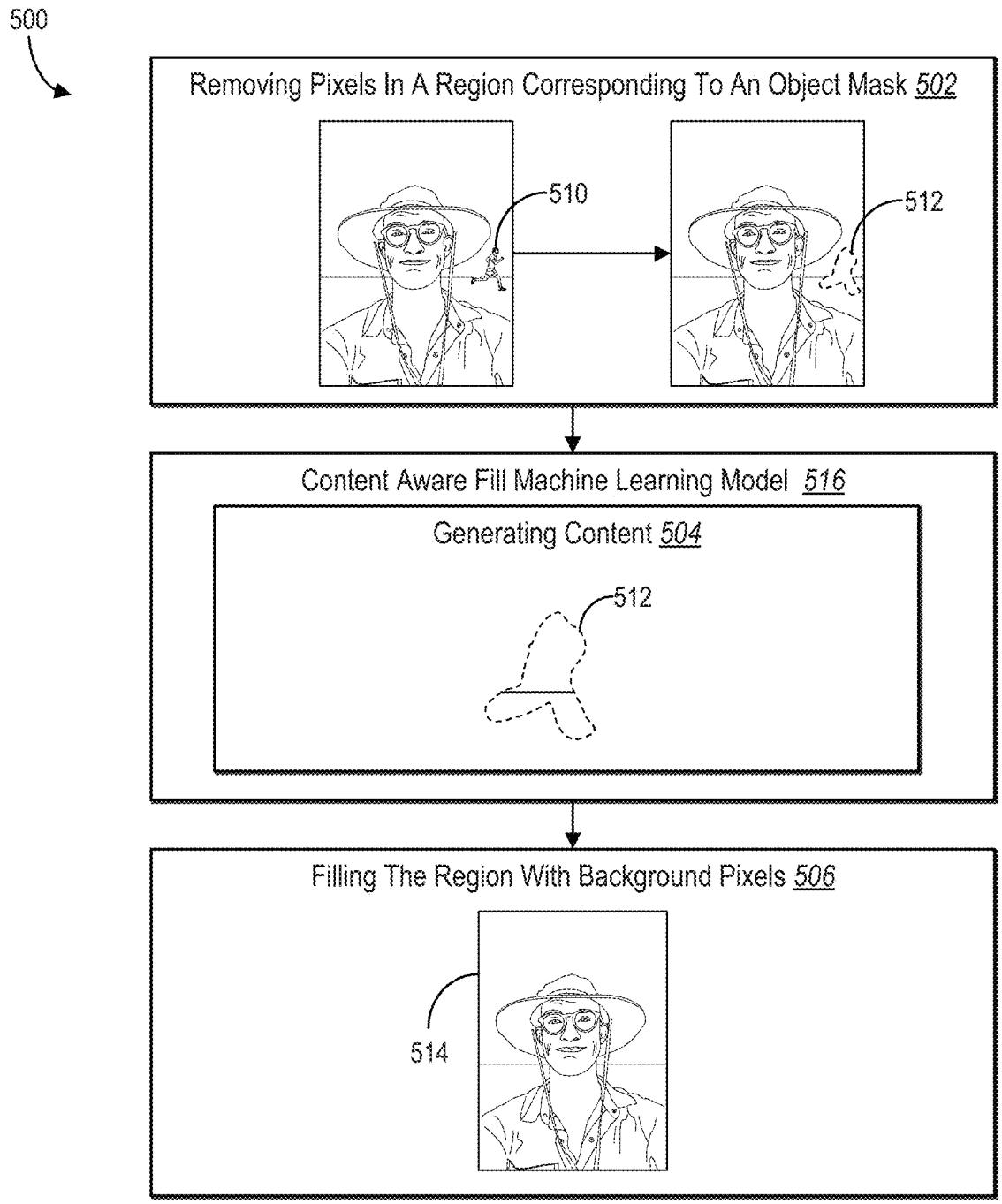
FIG. 5 illustrates an object-aware texture transfer system utilizing one or more machine learning models to inpaint a background hole created by an extracted object in accordance with one or more embodiments.

Having generated an object mask for a detected and selected object, the object-aware texture transfer system 106 deletes the pixels of the object mask, thus generating a hole. The object-aware texture transfer system 106 generates content to fill the hole utilizing a content aware fill machine learning model or neural network and fills the hole with the generated content. For example, FIG. 5 illustrates a series of acts 500 by which the object-aware texture transfer system 106 generates an intermediate modified digital image in accordance with one or more embodiments. In particular, the series of acts 500 includes an act 502 of removing pixels in a region corresponding to an object mask selected for removal, an act 504 of generating content to replace the removed object via a content aware fill machine learning model 516, and an act 506 of filling the region/hole with background pixels to generate an intermediate modified digital image 514.

As illustrated in FIG. 5, the object-aware texture transfer system 106 performs the act 502 of removing pixels in a region corresponding to an object mask. In particular, the object-aware texture transfer system 106 identifies the object to manipulate in a digital image. For example, as illustrated, the object-aware texture transfer system 106 determines (e.g., based on a user selection) that an object 510 is to be extracted. The object-aware texture transfer system 106 accesses the object mask corresponding to the object 510. The object-aware texture transfer system 106 determines a region 512 in the image that corresponds to the object mask. The object-aware texture transfer system 106 extracts the object 510 by removing or deleting the pixels in the region 512 corresponding to the object mask of the object 510.

As further illustrated in FIG. 5, the object-aware texture transfer system 106 performs the act 504 of generating content to replace the object. In particular, the object-aware texture transfer system 106 generates pixels within the region 512 corresponding to the object mask of the object 510. In some embodiments, the object-aware texture transfer system 106 generates the pixels within the region 512 utilizing the content aware fill machine learning model 516.

In one or more implementations, the object-aware texture transfer system 106 utilizes a content aware fill machine learning model 516 in the form of a deep inpainting model to generate the content (and optionally fill) the hole corresponding to the removed object. For example, the object-aware texture transfer system 106 utilizes a deep inpainting model trained to fill holes. In some embodiments, the object-aware texture transfer system 106 utilizes ProFill as described by Y. Zeng, Z. Lin, J. Yang, J. Zhang, E. Shechtman, and H. Lu, *High-Resolution Image Inpainting with Iterative Confidence Feedback and Guided Upsampling*, European Conf. on Computer Vision, 1-17 (2020)); or DeepFillv2 as described by J. Yu, Z. Lin, J. Yang, X. Shen, X. Lu, and T. S. Huang, *Free-Form Image Inpainting with Gated Convolution*, Proceedings of IEEE Int'l Conf. on Computer Vision, 4471-80 (2019), the entire contents of which are hereby incorporated by reference.

Alternatively, the object-aware texture transfer system 106 utilizes a deep inpainting model in the form of the CoModGAN model described by S. Zhao, J. Cui, Y. Sheng, Y. Dong, X. Liang, E. I. Chang, and Y. Xu in *Large Scale Image Completion via Co-Modulated Generative Adversarial Networks*, arXiv:2103.10428, Int'l Conf. on Learning Representations (2021), the entire contents of which are hereby incorporated by reference. In other embodiments, the object-aware texture transfer system 106 utilizes a different deep inpainting model such as a transformer-based model such as TFill (C. Zheng, T.-J. Cham, and J. Cai, *TFill: Image Completion via a Transformer-Based Architecture*, arXiv: 2104:00845 (2021)) or ICT (Z. Wan, J. Zhang, D. Chen, and J. Liao, *High-Fidelity Pluralistic Image Completion with Transformers*, arXiv:2103:14031 (2021)), the entire contents of which are hereby incorporated by reference.

The series of acts 500 includes the act 506 of filling the region 512 with generated pixels. In particular, the object-aware texture transfer system 106 generates the intermediate modified digital image 514 of the image stream by filling the region 512 with pixels generated in the previous step. As described above in relation to FIG. 3, in one or more embodiments, the object-aware texture transfer system 106 utilizes the intermediate modified digital image 514 having the object 510 extracted and the hole (i.e., region) 512 filled for style transfer, whether the digital image be a source digital image or a target digital image.

As mentioned above, in one or more embodiments, the object-aware texture transfer system 106 transfers global style features between digital images utilizing a style transfer neural network. For example, FIG. 6 illustrates the object-aware texture transfer system 106 transferring global style features from a source digital image 604 to a target digital image 602 utilizing a style transfer neural network comprising an encoder neural network 606 and a generator neural network 616.

Figure 6:
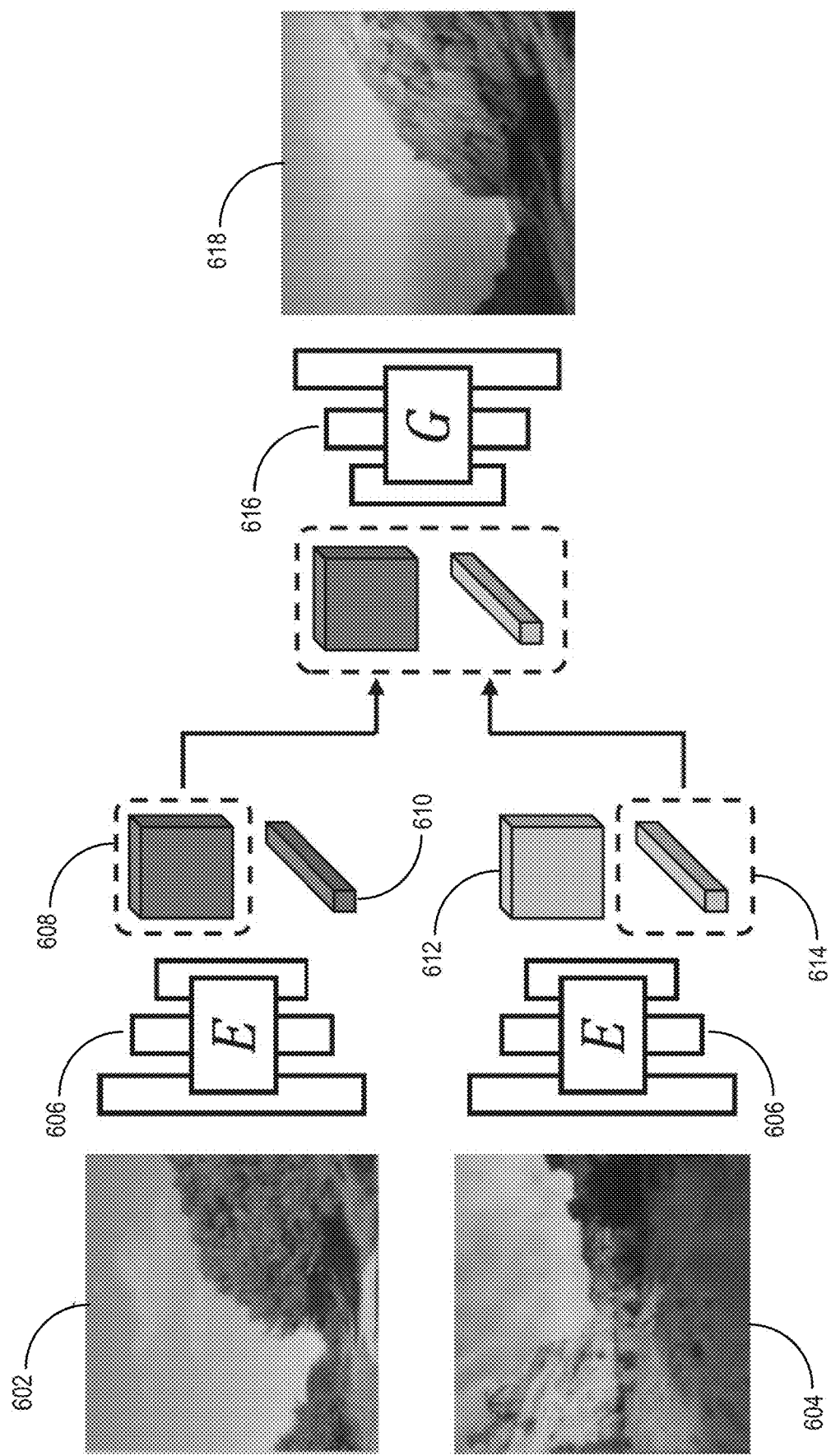
FIG. 6 illustrates an object-aware texture transfer system utilizing one or more machine learning models to transfer global style features between digital images in accordance with one or more embodiments.

As shown in FIG. 6, the object-aware texture transfer system 106 utilizes a global and spatial autoencoder including the encoder neural network 606 and the generator neural network 616 to extract spatial features and global features from digital images 602, 604. An encoder neural network refers to a neural network that extracts features from a digital image. In particular, an encoder neural network extracts latent code from a digital image, including a spatial code and a global code. In some embodiments, an encoder neural network includes residual blocks that are blocks within a main branch of layers of the encoder neural network and that are utilized to generate a global code. In these or other embodiments, an encoder neural network includes layout blocks that are blocks not within the main branch of the encoder neural network and that are utilized to analyze intermediate (e.g., non-output) features to generate a spatial code. Additional detail regarding the architecture of the encoder neural network is provided below with reference to FIG. 6.

Additionally, a generator neural network refers to a neural network that generates a modified digital image by combining spatial codes and global codes. In particular, a generator neural network generates a modified digital image by combining a spatial code from one digital image with a global code from another digital image. Additional detail regarding the architecture of the generator neural network is provided below with reference to FIG. 6.

As illustrated in FIG. 6, the object-aware texture transfer system 106 utilizes a global and spatial autoencoder (i.e., a style transfer neural network) that includes the encoder neural network 606 and the generator neural network 616 to generate the modified digital image 618 from the target digital image 602 and the source digital image 604. In particular, the object-aware texture transfer system 106 utilizes the encoder neural network 606 to extract a spatial code 608 and a global code 610 from the target digital image 602. Indeed, the object-aware texture transfer system 106 applies the encoder neural network 606 to the target digital image 602 to generate spatial features for the spatial code 608 and global features for the global code 610.

In a similar fashion, the object-aware texture transfer system 106 utilizes the encoder neural network 606 to extract the spatial code 612 and the global code 614 from the source digital image 204. More specifically, the object-aware texture transfer system 106 extracts spatial features from the source digital image 604 for the spatial code 612. In addition, the object-aware texture transfer system 106 extracts global features from the source digital image 604 for the global code 614.

As shown in FIG. 6, the object-aware texture transfer system 106 utilizes the same encoder neural network 606 to extract the global and spatial codes from each of the target and source digital images 602, 604. In some embodiments, the object-aware texture transfer system 106 utilizes two separate encoders: a spatial encoder neural network to extract the spatial code 608 (and the spatial code 612) and a global encoder neural network to extract the global code 610 (and the global code 614).

In addition to extracting spatial codes and global codes, the object-aware texture transfer system 106 generates the modified digital image 618 by combining or otherwise modifying latent codes (e.g., the spatial and/or global code). For example, the object-aware texture transfer system 106 selects an extracted spatial code from one digital image (e.g., the target digital image 602) and an extracted global code from another digital image (e.g., the source digital image 604) to combine together. Indeed, the object-aware texture transfer system 106 utilizes the generator neural network 616 to combine a first spatial code 608 (e.g., the spatial code 608 from the target digital image 602) with a second global code 614 (e.g., the global code 614 from the source digital image 604) to generate the modified digital image 618.

As a result of utilizing the first spatial code 608 and the second global code 614, the modified digital image 618 includes the geometric layout of the target digital image 602 with the overall appearance (i.e., the global style or texture) of the source digital image 604. Indeed, as shown in FIG. 6, the modified digital image 618 portrays a desert cliff scene with the shading and color scheme (with lots of tan and brown colors) of the source digital image 604 (from the global code 614) that also illustrates desert cliffs with a large, shaded area. In addition, the modified digital image 618 has the shape or layout of the target digital image 602 (from the spatial code 608) that depicts a large round-shaped tree on the right side with smaller shrubbery on the left, tapering toward the middle of the image. Indeed, as shown, the modified digital image 618 has the same layout as the target digital image 602 with the rounded shape for the cliffs on the right and the smaller, tapering cliffs to the left.

In addition to generating the modified digital image 618 by swapping codes (e.g., swapping spatial codes and global codes between the target digital image 202 and the source digital image 604), the object-aware texture transfer system 106 generates modified digital images by modifying latent codes to edit attributes or blend styles.

To achieve the accuracy in generating a modified digital image (e.g., the modified digital image 618) from extracted spatial codes and extracted global codes, the object-aware texture transfer system 106 learns parameters for the style transfer neural network. In particular, the object-aware texture transfer system 106 learn parameters for the encoder neural network 606 and the generator neural network 616 based on at least two different objectives: 1) to accurately reconstruct an input digital image and 2) to swap components (e.g., spatial codes and/or global codes) to generate a new hybrid digital image (sometimes referred to as "code swapping").

As mentioned above, the object-aware texture transfer system 106 generates an attribute code based on extracting global codes from multiple digital images. As used herein, the term attribute code refers to a feature vector or a tensor that describes or represents an attribute of a digital image. By combining an attribute code with a spatial code, the object-aware texture transfer system 106 generates a modified digital image with a modified attribute. As used herein, the term attribute refers to a visual, observable trait or characteristic of a digital image. For example, an attribute includes a degree or a size of a smile on a face within a digital image. An attribute also optionally includes an amount of snow within a digital image. Other attributes include a size (e.g., a height and/or a width) of an object within a digital image, a color of an object within a digital image, and an amount (e.g., a coverage area) of a particular color or texture within a digital image.

Figure 7:
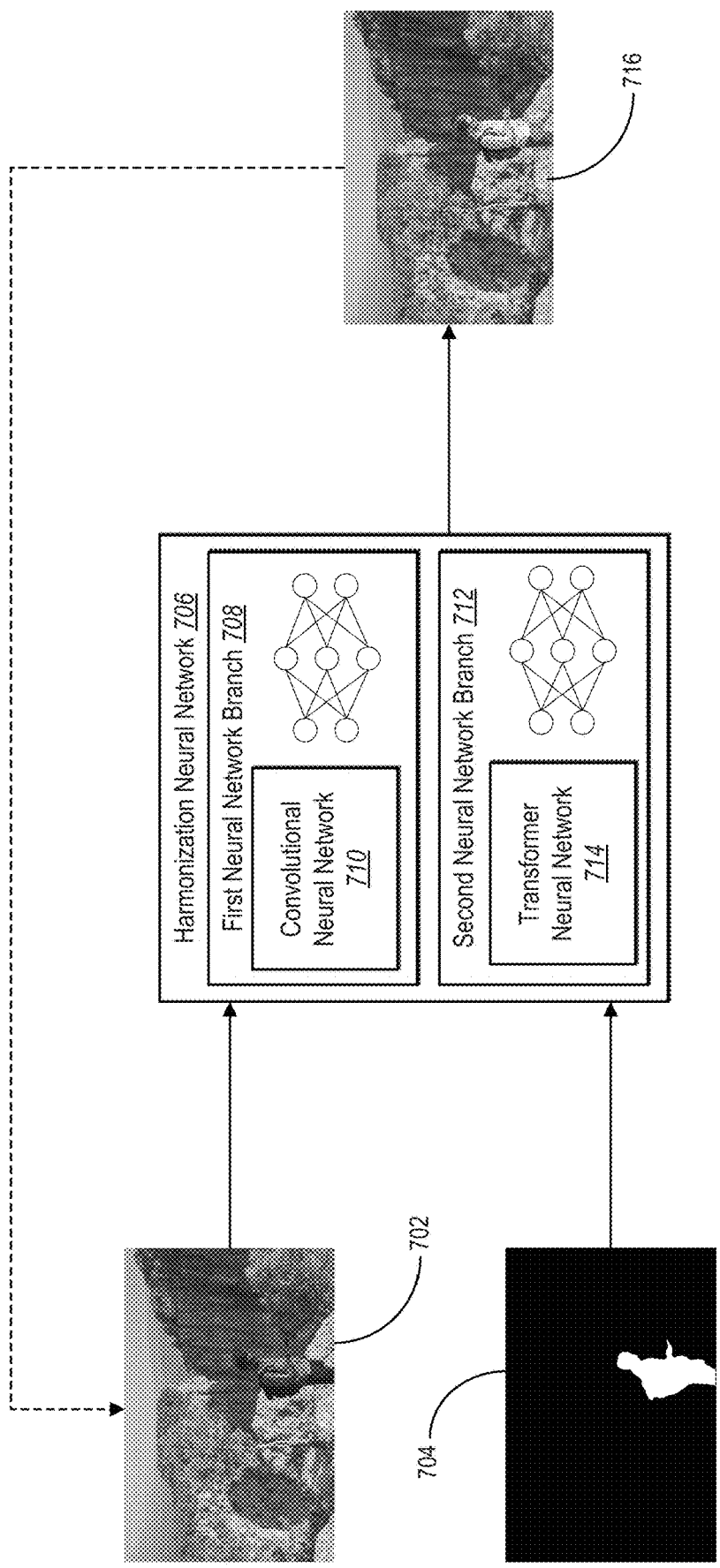
FIG. 7 illustrates an object-aware texture transfer system utilizing one or more machine learning models to harmonize an object inserted into a digital image in accordance with one or more embodiments.

As discussed above, in some embodiments, the object-aware texture transfer system 106 reinserts one or more extracted objects into a modified digital image after texture transference and harmonizes a background region of the modified digital image proximate to the reinserted objects. For example, FIG. 7 illustrates the object-aware texture transfer system 106 generating a harmonized digital image utilizing a harmonization neural network 706 having a dual-branched neural network architecture. Indeed, as shown in FIG. 7, the object-aware texture transfer system 106 provides a modified digital image 702 with a reinserted object (i.e., the person portrayed in the foreground) and a segmentation mask 704 (e.g., an object mask generated as described above in relation to FIGS. 4-5) corresponding to the reinserted object to a harmonization neural network 706.

The modified digital image 702 comprises a background image and a foreground object combined together. Prior to harmonization of the foreground object with the background image, the modified digital image 702 appears unrealistic due to visual disharmony between the reinserted foreground object (e.g., the portrayed person) and the modified background image. In this case, the visual disharmony corresponds to a distinct difference in lighting, contrast, or color between the reinserted foreground object and the background image. The segmentation mask 704 comprises a binary pixel mapping corresponding to the modified digital image 702. In particular, the segmentation mask 704 comprises a binary pixel mapping of the background and foreground regions of an original target digital image from with the modified digital image 702 was derived according to the embodiments described herein.

Based on the modified digital image 702 and the segmentation mask 704, the object-aware texture transfer system 106 uses the harmonization neural network 706 to generate a harmonized digital image 716. In some embodiments, the object-aware texture transfer system 106 uses the harmonization neural network 706 to extract both local information and global information from the modified digital image 702. To do so, the object-aware texture transfer system 106 leverages the harmonization neural network 706 comprising a first neural network branch 708 and a second neural network branch 712.

In one or more embodiments, the first neural network branch 708 comprises a convolutional neural network 710. Utilizing the convolutional neural network 710, the object-aware texture transfer system 106 extracts local information from the modified digital image 702. For example, the object-aware texture transfer system 106 uses the convolutional neural network 710 to extract local color information around the foreground object.

Additionally, in one or more embodiments, the second neural network branch 712 comprises a transformer neural network 714. Utilizing the transformer neural network 714, the object-aware texture transfer system 106 extracts global information from the modified digital image 202. To illustrate, the object-aware texture transfer system 106 uses the transformer neural network 714 to extract color information from region-to-region across a background of the modified digital image 702 (including regions beyond a local area around the foreground object).

From the local information and the global information, the object-aware texture transfer system 106 generates the harmonized digital image 716. Indeed, as shown in FIG. 7, the harmonized composite digital image 716 comprises a background and foreground with matching, realistic image characteristics (e.g., color qualities, contrast, lighting conditions, etc.). In this manner, the object-aware texture transfer system 106 generates accurate harmonized digital images.

Moreover, in one or more embodiments, the object-aware texture transfer system 106 uses an iterative approach (as indicated by the dashed arrow from the harmonized digital image 716 back to the model inputs). Indeed, in one or more embodiments, the object-aware texture transfer system 106 iterates the foregoing approach by using the output of one iteration (e.g., the harmonized digital image 716) as the input for a next iteration. In this manner, the object-aware texture transfer system 106 flexibly controls how mild or aggressive to harmonize a foreground object and a background image.

Figure 8:
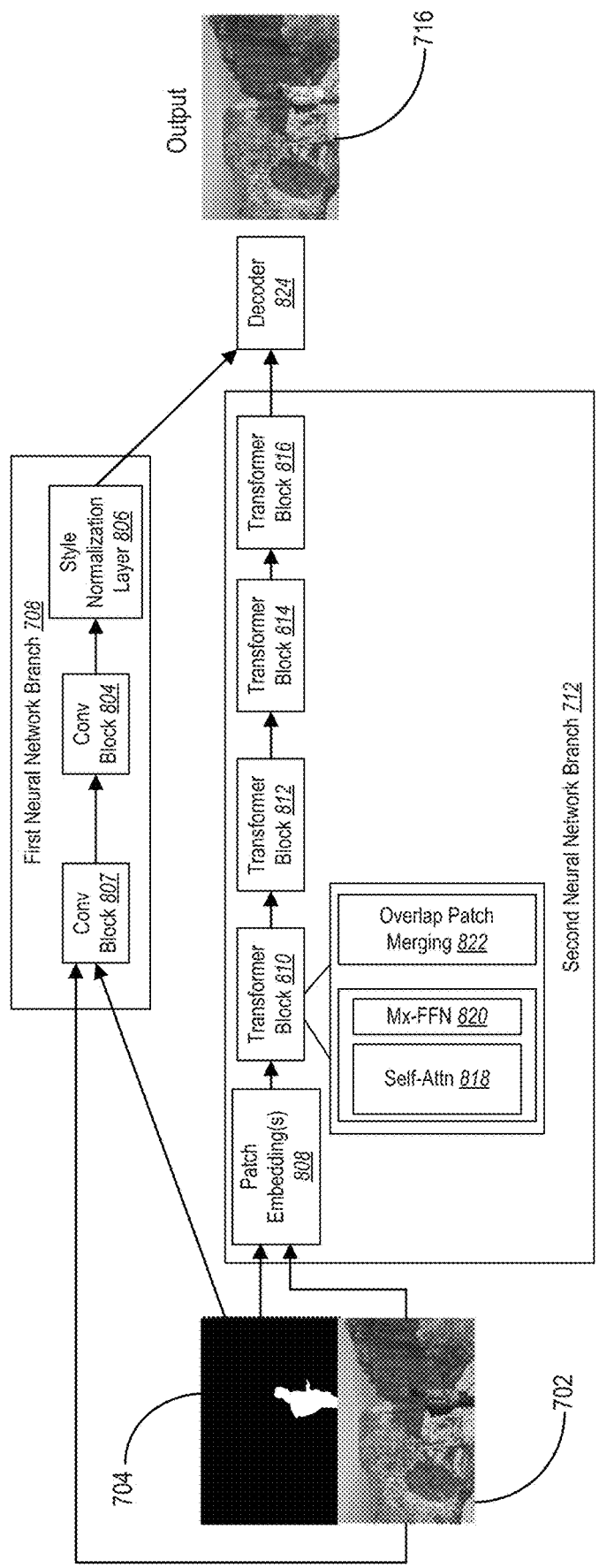
FIG. 8 illustrates an object-aware texture transfer system inserting an extracted object into a digital image and harmonizing the object with the background of the digital image using dual neural network branches of a harmonization neural network in accordance with one or more embodiments.

As discussed above, in some embodiments, the object-aware texture transfer system 106 uses a dual-branched neural network architecture to intelligently harmonize inserted objects with image foreground in modified digital images. In accordance with one or more embodiments, FIG. 8 illustrates the object-aware texture transfer system 106 using a particular architecture of neural network branches to generate a harmonized digital image. In particular, FIG. 8 illustrates additional detail of the harmonization neural network discussed above in relation to FIG. 7.

As further shown in FIG. 8, the object-aware texture transfer system 106 provides the modified digital image 702 and the segmentation mask 704 to the first neural network branch 708 (e.g., for local information extraction). In particular, the object-aware texture transfer system 106 uses convolutional neural network layers 807, 804 of the first neural network branch 708 to extract local information of the background adjacent to the inserted foreground object. For example, the object-aware texture transfer system 106 uses the convolutional neural network layers 807, 804 to generate local background feature vectors that represent background information at a localized region of the background adjacent to the inserted foreground object. In certain implementations, the local background feature vectors comprise encoded values (e.g., representative of color information, such as pixel color values).

Further, in certain embodiments, the object-aware texture transfer system 106 uses the convolutional neural network layers 807, 804 to generate local background feature vectors comprising style information corresponding to the background. For example, the local background feature vectors represent pixel-level statistics of certain image characteristics. To illustrate, the local background feature vectors represent a mean and standard deviation of pixel color values for pixels located around the composited foreground object (or elsewhere in the modified digital image 702).

In one or more embodiments, the first neural network branch 708 further comprises a style normalization layer 806. The object-aware texture transfer system 106 uses the style normalization layer 806 to inject style information from the background into the inserted foreground object. To do so, the object-aware texture transfer system 106 provides, as inputs, the local background feature vectors, and the segmentation mask 704 to the style normalization layer 806.

If not previously determined using the convolutional neural network layers 807, 804, object-aware texture transfer system 106 uses the style normalization layer 806 to extract style information from the background. For example, the object-aware texture transfer system 106 uses the segmentation mask 704 to identify the region to be harmonized (i.e., the inserted foreground object). In turn, the object-aware texture transfer system 106 uses the style normalization layer 806 to determine pixel-level statistics of certain image characteristics of the background, the inserted foreground object, or both. To illustrate, object-aware texture transfer system 106 uses the style normalization layer 806 to determine a mean and standard deviation of pixel color values for pixels located around the inserted foreground object. Additionally, or alternatively, the object-aware texture transfer system 106 uses the style normalization layer 806 to determine a mean and standard deviation of pixel color values for pixels located in the background and pixels located in the foreground.

Based on the extracted style information, the object-aware texture transfer system 106 uses the style normalization layer 806 (e.g., an Instance Harmonization layer) to generate style-normalized foreground feature vectors for the inserted foreground object. For example, the object-aware texture transfer system 106 provides the pixel-level statistics (e.g., the mean and standard deviation of pixel color values) as style parameters for the style normalization layer 806. The object-aware texture transfer system 106 causes the style normalization layer 806 to use these parameters for foreground adjustment operations. To illustrate, the object-aware texture transfer system 106 causes the style normalization layer 806 to modify (e.g., normalize) foreground feature vectors representing image characteristics of the inserted foreground object based on the style parameters. Example operations to generate such style-normalized foreground feature vectors are further explained by Ling et al., *Region-*

*aware Adaptive Instance Normalization for Image Harmonization*, In Proceedings of the IEEE/CVF Conference on Computer Vision and Pattern Recognition (2021), pages 9361-9370, the entire contents of which are incorporated herein by reference.

Additionally shown in FIG. 8, the object-aware texture transfer system 106 provides the modified digital image 702 and the segmentation mask 704 to the second neural network branch 712. In the second neural network branch 712, the object-aware texture transfer system 106 leverages a transformer neural network to extract global information from a digital image.

Preparatory for the transformer neural network, the object-aware texture transfer system 106 performs one or more different operations. For example, the object-aware texture transfer system 106 divides the modified digital image 702 into image patches (e.g., of size 4 pixels×4 pixels, albeit different sized patches may be utilized). Additionally, or alternatively, in certain embodiments, the object-aware texture transfer system 106 overlaps one or more of the image patches. Based on the image patches, the object-aware texture transfer system 106 generates patch embedding(s) 808. For example, the object-aware texture transfer system 106 generates the patch embedding(s) 808 by encoding image features or characteristics (e.g., pixel color values) associated with the image patches. It will be appreciated that the object-aware texture transfer system 106 utilizes one or more different encoders for generating the patch embedding(s) 808.

The object-aware texture transfer system 106 provides the patch embedding(s) 808 to the transformer neural network comprising transformer neural network layers 810-816. In some embodiments, the object-aware texture transfer system 106 uses the transformer neural network layers 810-816 to generate multi-level feature vectors corresponding to the modified digital image 702 at a plurality of image resolutions (e.g., based on the patch embedding(s) 808). For instance, the object-aware texture transfer system 106 uses the transformer neural network layers 810-816 to generate multi-level feature vectors comprising high-resolution coarse features and low-resolution fine features from the patch embedding(s) 808. To illustrate, the object-aware texture transfer system 106 uses the transformer neural network layers 810-816 to generate multi-level feature vectors that capture patch-specific color information, contrast information, lighting condition information, etc. at fractional image resolutions (e.g., ¼, ⅛, 1/16, 1/32, etc.) of the original image resolution of the modified digital image 702.

To generate the multi-level feature vectors as just described, the object-aware texture transfer system 106 implements one or more different architectures for the transformer neural network layers 810-816. As shown in FIG. 8, the transformer neural network layers 810-816 comprise a self-attention neural network layer 818, a mix-FFN (feed forward network) 820, and an overlap patch merging operation 822.

In one or more embodiments, the object-aware texture transfer system 106 uses the self-attention neural network layer 818 to intelligently weight image characteristics. For example, the object-aware texture transfer system 106 uses the self-attention neural network layer 818 to weight (e.g., emphasize or discount) image characteristics at certain regions or patches of the modified digital image 702. As another example, the object-aware texture transfer system 106 uses the self-attention neural network layer 818 to weight image characteristics based on their values. For instance, the object-aware texture transfer system 106 uses the self-attention neural network layer 818 to weight the highest pixel color values (e.g., highlight values) and the lowest pixel color values (e.g., shadow values) according to a predetermined or learned weighting scheme.

In addition, the object-aware texture transfer system 106 uses the mix-FFN 820 to factor in the effect of zero padding to leak location information. For example, in some embodiments, the mix-FFN 820 comprises a 3×3 convolutional neural network layer to factor in the effect of zero padding to leak location information.

Further, the object-aware texture transfer system 106 causes the transformer neural network layers 810-816 to perform the overlap patch merging operation 822. The overlap patch merging operation 822 comprises one or more operations to merge features from the patch embedding(s) 808. For instance, the overlap patch merging operation 822 comprises combining encoded values from the patch embedding(s) 808 with modified encoded values generated by the self-attention neural network layer 818 and/or the mix-FFN 820. Additional or alternative operations are also herein contemplated.

The object-aware texture transfer system 106 uses a decoder 824 to generate the harmonized digital image 716 based on local information from the first neural network branch 708 and global information from the second neural network branch 712. For example, the object-aware texture transfer system 106 uses the decoder 824 to generate the harmonized digital image 716 based on the multi-level feature vectors from the second neural network branch 712 and the style-normalized foreground feature vectors from the first neural network branch 708. In some embodiments, the decoder 824 comprises one or more transpose convolutional neural network layers to merge the multi-level feature vectors from the second neural network branch 712 and the style-normalized foreground feature vectors from the first neural network branch 708. In additional or alternative embodiments, the decoder 824 comprises a different architecture to decode the local information and the global information just described.

Based on the decoding, the harmonized digital image 716 comprises one or more modifications relative to the input modified digital image 702. For example, in one or more embodiments, the harmonized digital image 716 comprises the inserted foreground object with modified pixel color values based on the decoding of the local information and the global information.

Figure 9:
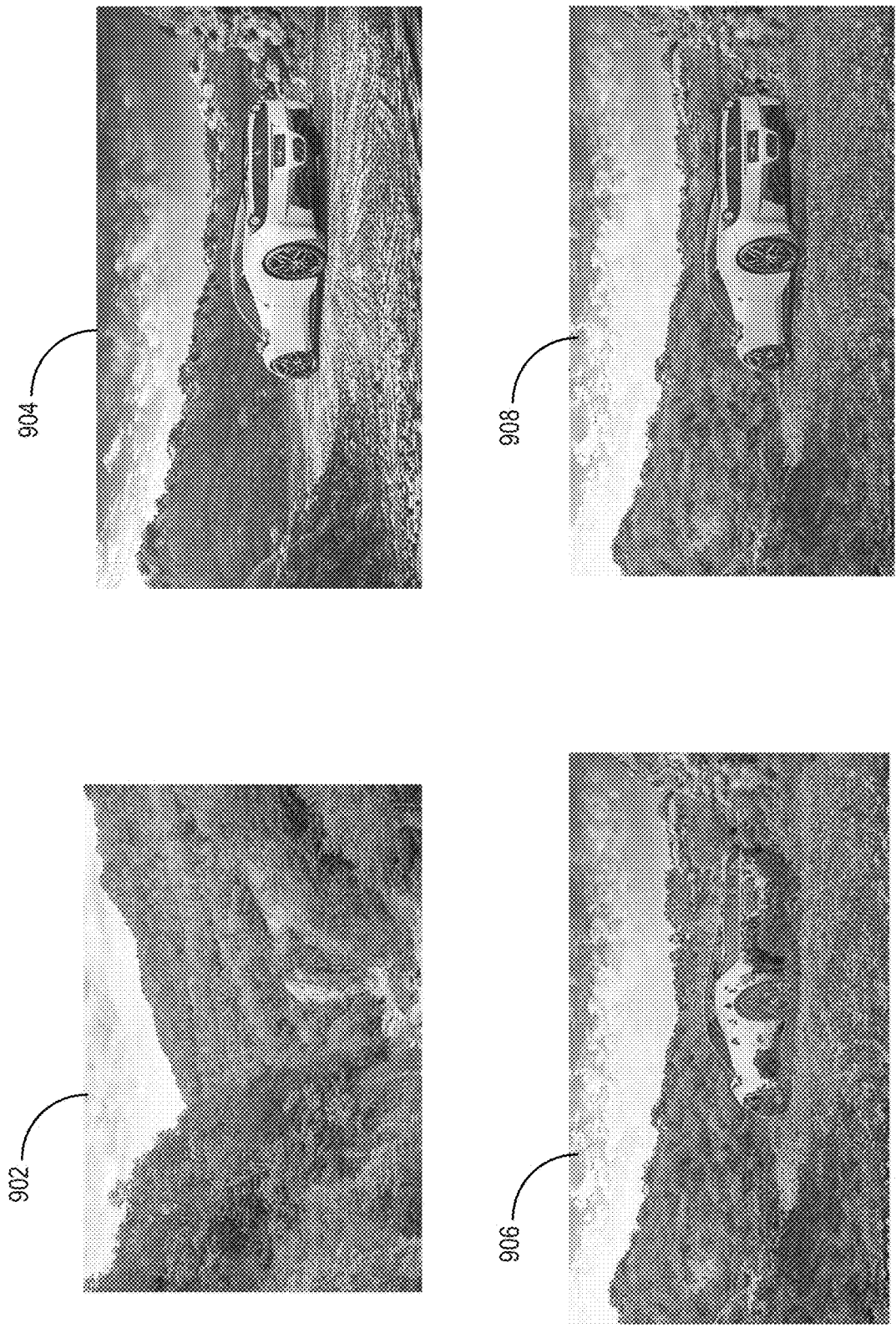
FIG. 9 illustrates experimental results of an object-aware texture transfer system in accordance with one or more embodiments.

To further illustrate, FIG. 9 shows experimental results of an object-aware texture transfer system 106 generating a modified digital image 908 in accordance with embodiments of the present disclosure. Specifically, FIG. 9 shows results of an object-aware texture transfer system 106 transferring global style features from a source digital image 902 to a target digital image 904 while maintaining an object style of an object (i.e., the white car) portrayed within the target digital image 904. As further shown in FIG. 9, modified digital image 906 is the result of transferring global style features between the source digital image 902 and the target digital image 904 without maintaining the object style of the portrayed object. Indeed, as shown in FIG. 9, the modified digital image 908 exhibits a significantly more realistic portrayal of the object (i.e., the car) within the image after transference of the global style of the source digital image 802 thereto.

Figure 10:
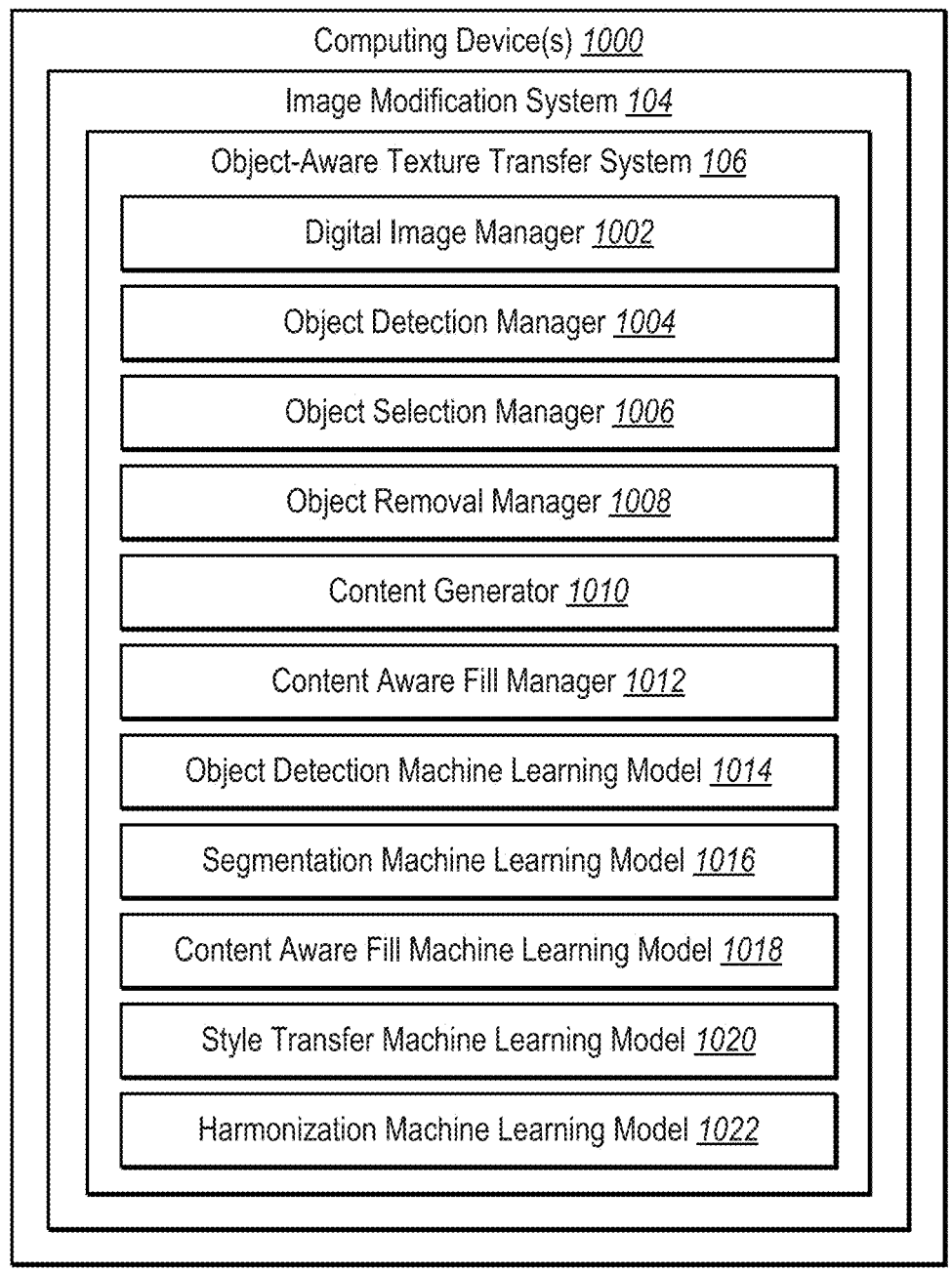
FIG. 10 illustrates a schematic diagram of an object-aware texture transfer system in accordance with one or more embodiments.

Turning now to FIG. 10, additional detail will be provided regarding components and capabilities of one or more embodiments of the object-aware texture transfer system 106. In particular, FIG. 10 illustrates an example object-aware texture transfer system 106 executed by a computing device 1000 (e.g., the server devices(s) 102 or the client device 110). As shown by the embodiment of FIG. 10, the computing device 1000 includes or hosts an image modification system 104 and the object-aware texture transfer system 106. Furthermore, as shown in FIG. 10, the object-aware texture transfer system 106 includes a digital image manager 1002, an object detection manager 1004, an object selection manager 1006, an object removal manager 1008, a content generator 1010, and a content aware fill manager 1012. Additionally, the illustrated object-aware texture transfer system 106 includes an object detection machine learning model 1014, a segmentation machine learning model 1016, a content aware fill machine learning model 1018, a style transfer machine learning model 1020, and a harmonization machine learning model 1022. Each of the components mentioned above is described below in turn.

As just mentioned, and as illustrated in the embodiment of FIG. 10, the object-aware texture transfer system 106 includes the digital image manager 1002. For instance, the digital image manager 1002 identifies, stores, transmits, and/or displays digital images (and/or digital videos) as described above (e.g., in relation to FIGS. 1-9). In some instances, the digital image manager 1002 stores digital images with corresponding latent code/vectors pre-embedded in latent space using an encoder as described above (e.g., in relation to FIGS. 4-8).

Furthermore, the object-aware texture transfer system 106 performs a variety of object detection, selection, removal, and content generation tasks as described in greater detail above (e.g., in relation to FIGS. 4-5). For instance, the object detection manager 1004 detects objects via the object detection machine learning model 1014 within a digital image provided to the computing device 1000. Moreover, the object-aware texture transfer system 106 via the segmentation machine learning model 1016 segments detected objects and generates object masks. The object selection manager 1006 oversees the selection of detected objects while the object removal manager 1008 oversees removing selected objects. Also, the object-aware texture transfer system 106 removes selected objects then fills holes left by the removed objects with the content generator 1010, the content aware fill manager 1012, and the content aware fill machine learning model 1018.

With objects removed and resultant holes filled in a target and/or a source digital image, the object-aware texture transfer system 106 then utilizes the style transfer machine learning model 1020 to transfer global style features between the images, according to one or more embodiments described herein (e.g., in relation to FIGS. 1-3 and 6). Also, in response to reinserting the objects in the resulting image, the object-aware texture transfer system 106 utilizes the harmonization machine learning model 1022 to harmonize a background of the modified digital image and the reinserted objects to generate a realistic modified digital image with the global style transferred and the object style maintained, as described in greater detail above (e.g., in relation to FIGS. 7-9).

Each of the components 1002-1022 of the object-aware texture transfer system 106 include software, hardware, or both. For example, the components 1002-1022 include one or more instructions stored on a computer-readable storage medium and executable by processors of one or more computing devices, such as a client device or server device. When executed by the one or more processors, the computer-executable instructions of the object-aware texture transfer system 106 causes the computing device(s) 1000 to perform the methods described herein. Alternatively, the components 1002-1022 include hardware, such as a special-purpose processing device to perform a certain function or group of functions. Alternatively, the components 1002-1022 of the object-aware texture transfer system 106 include a combination of computer-executable instructions and hardware.

Furthermore, the components 1002-1022 of the object-aware texture transfer system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1022 may be implemented as a stand-alone application, such as a desktop or mobile application. Furthermore, the components 1002-1022 may be implemented as one or more web-based applications hosted on a remote server. The components 1002-1022 may also be implemented in a suite of mobile device applications or "apps." To illustrate, the components 1002-1022 may be implemented in an application, including but not limited to, ADOBE PHOTOSHOP, ADOBE PREMIERE, ADOBE LIGHTROOM, ADOBE ILLUSTRATOR, ADOBE CREATIVE CLOUD, or ADOBE STOCK. "ADOBE," "ADOBE PHOTOSHOP," "ADOBE PREMIERE," "ADOBE LIGHTROOM," "ADOBE ILLUSTRATOR," "ADOBE CREATIVE CLOUD," and "ADOBE STOCK" are either registered trademarks or trademarks of Adobe Systems Incorporated in the United States and/or other countries.

Figure 11:
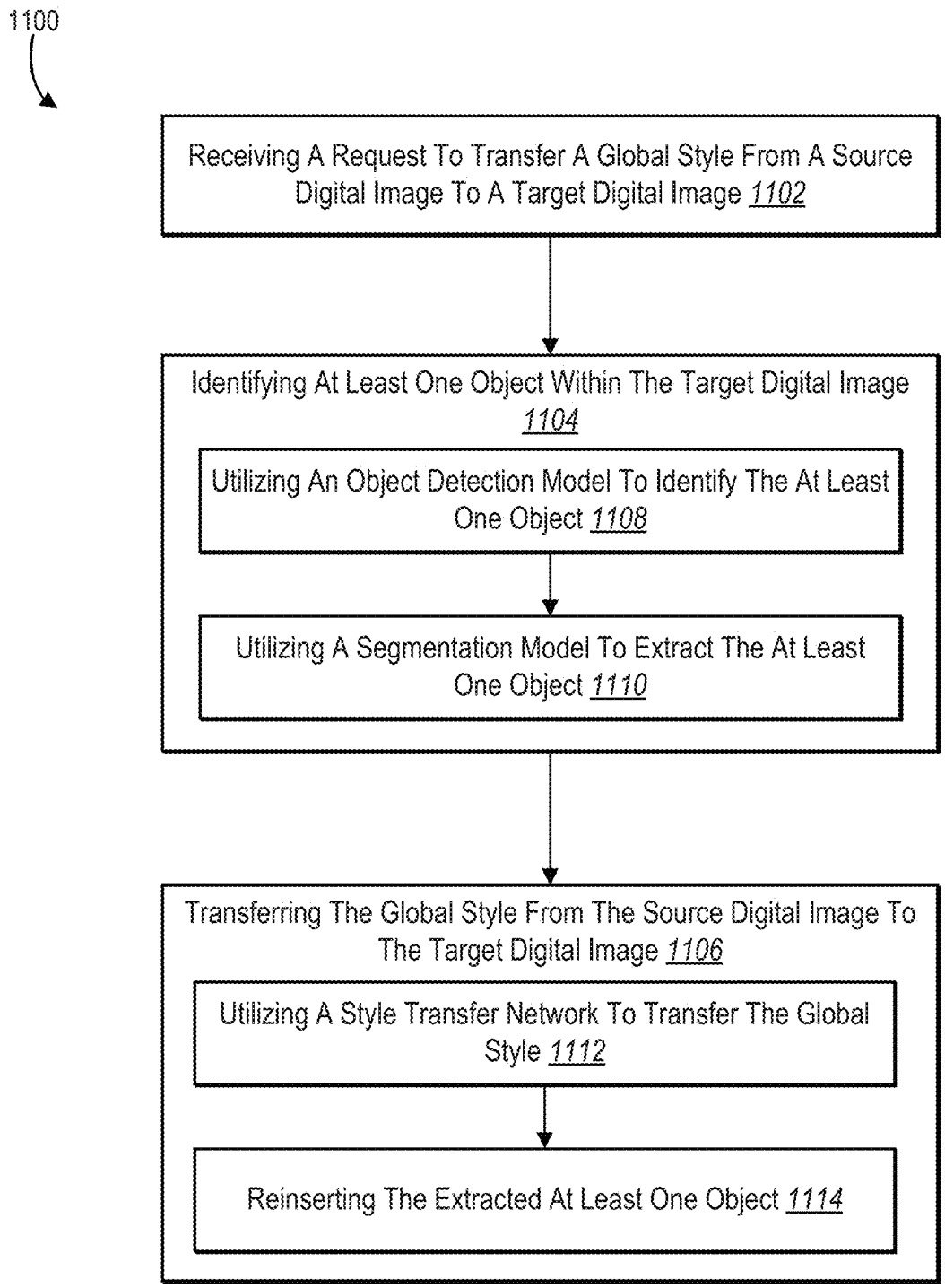
FIG. 11 illustrates a flowchart of a series of acts for performing object aware texture transfer in accordance with one or more embodiments.

FIGS. 1-10, the corresponding text, and the examples provide a number of different methods, systems, devices, and non-transitory computer-readable media of the object-aware texture transfer system 106. In addition to the foregoing, one or more embodiments are also described in terms of flowcharts comprising acts for accomplishing a particular result, as shown in FIG. 11. The acts shown in FIG. 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some embodiments, a system can be configured to perform the acts of FIG. 11. Alternatively, the acts of FIG. 11 can be performed as part of a computer-implemented method.

As mentioned above, FIG. 11 illustrates a flowchart of a series of acts 1100 for generating a modified digital image in accordance with one or more embodiments. While FIG. 11 illustrates acts according to one embodiment, alternative embodiments may omit, add to, reorder, and/or modify any acts shown in FIG. 11.

As shown in FIG. 11, the series of acts 1100 includes an act 1102 of receiving a request to transfer a global style from a source digital image to a target digital image. In particular, in one or more embodiments, the act 1102 includes receiving a request to transfer a global style from a source digital image to a target digital image. In some embodiments, the act 1102 includes receiving a request comprising a selection of at least one target object within the target digital image to be maintained in appearance during transference of the global style from the source digital image. Also, in some embodiments, the act 1102 includes receiving a request to transfer that comprises a selection of the at least one target object for extraction from within the target digital image.

As shown in FIG. 11, the series of acts 1100 includes an act 1104 of identifying at least one object within the target digital image. As also shown in FIG. 11, the act 1104 can further include an act 1108 for utilizing an object detection model to identify the at least one object and an act 1110 for utilizing a segmentation model to extract the at least one object. In particular, in one or more embodiments, the act 1104 includes identifying, in response to receiving the request to transfer, at least one target object within the target digital image. Further, in some embodiments, the act 1104 includes identifying the at least one target object within the target digital image comprises by utilizing an object detection machine learning model to identify at least one foreground object within the target digital image. Further still, in some embodiments, the act 1104 includes extracting the at least one target object from within the target digital image utilizing a segmentation model. Also, in some embodiments, the act 1104 includes generating, in response to extracting the at least one target object from within the target digital image, a content fill for a hole corresponding to the at least one target object and filling the hole corresponding to the at least one target object with the content fill.

Moreover, in one or more embodiments, the act 1104 includes identifying, in response to receiving the request to transfer, at least one source object within the source digital image, extracting the at least one source object from within the source digital image to generate an intermediate source digital image, and generating the modified digital image by transferring the global style from the intermediate source digital image to the target digital image.

Also, in some embodiments, the act 1104 includes extracting, in response to receiving the request to transfer, at least one target object from within the target digital image to generate a first intermediate digital image. In some embodiments, the act 1104 also includes utilizing a segmentation model to extract the at least one target object from within the target digital image. Additionally, in one or more embodiments, the act 1104 includes generating the first intermediate digital image by generating, utilizing a content aware fill machine learning model, a content fill for a hole corresponding to the at least one target object. In some embodiments, the act 1104 includes identifying the at least one target object to be extracted from the target digital image utilizing an object detection machine learning model.

Furthermore, in some embodiments, the act 1104 includes identifying at least one source object in the source digital image, the at least one source object comprising a different style than the global style of the source digital image, and modifying the source digital image by extracting, utilizing the segmentation model, the at least one source object from within the source digital image and generating a content fill for a hole corresponding to the at least one source object.

As shown in FIG. 11 the series of acts 1100 includes an act 1106 of transferring the global style from the source digital image to the target digital image. As also shown in FIG. 11, the act 1106 can include an act 1112 for utilizing a style transfer network to transfer the global style and an act 1114 for reinserting the extracted at least one object. In particular, in one or more embodiments, the act 1106 includes transferring, utilizing a style transfer neural network, the global style from the source digital image to the target digital image while maintaining an object style of the at least one target object in the source digital image to generate a modified digital image. Additionally, in some embodiments, the act 1106 includes reinserting at least one previously extracted target object into the target digital image in response to transferring the global style to generate the modified digital image. Further, in some embodiments, the act 1106 includes harmonizing the reinserted at least one target object with a background portion of the target digital image adjacent to the at least one target object.

Furthermore, in one or more embodiments, the act 1106 includes extracting, utilizing an encoder neural network, a global code from the source digital image comprising features corresponding to an overall appearance of the source digital image, extracting, utilizing the encoder neural network, a spatial code from the target digital image corresponding to a geometric layout of the target digital image, and generating, utilizing a generator neural network, the modified digital image by combining the global code of the source digital image with the spatial code of the target digital image.

Also, in some embodiments, the act 1106 includes transferring, utilizing a style transfer neural network, the global style from the source digital image to the first intermediate digital image to generate a second intermediate digital image, and inserting the at least one target object into the second intermediate digital image to generate a modified digital image. In some embodiments, the global style comprises a landscape texture within the source digital image. Additionally, in some embodiments, the act 1106 includes harmonizing the inserted at least one target object with a background portion of the second intermediate digital image adjacent to the at least one target object.

Further, in some embodiments, the act 1106 includes, in response to modifying the source digital image, transferring the global style from the source digital image to the first intermediate digital image to generate the modified digital image. Also, in some embodiments, the act 1106 includes extracting, utilizing an encoder neural network, a global code from the source digital image comprising features corresponding to an overall appearance of the source digital image, extracting, utilizing the encoder neural network, a spatial code from the target digital image corresponding to a geometric layout of the target digital image, and generating, utilizing a generator neural network, the modified digital image by combining the global code of the source digital image with the spatial code of the target digital image. Additionally, in some embodiments, the act 1106 includes generating the modified digital image by harmonizing, utilizing a harmonization neural network, the inserted at least one target object with a background of the second intermediate digital image adjacent to the at least one target object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
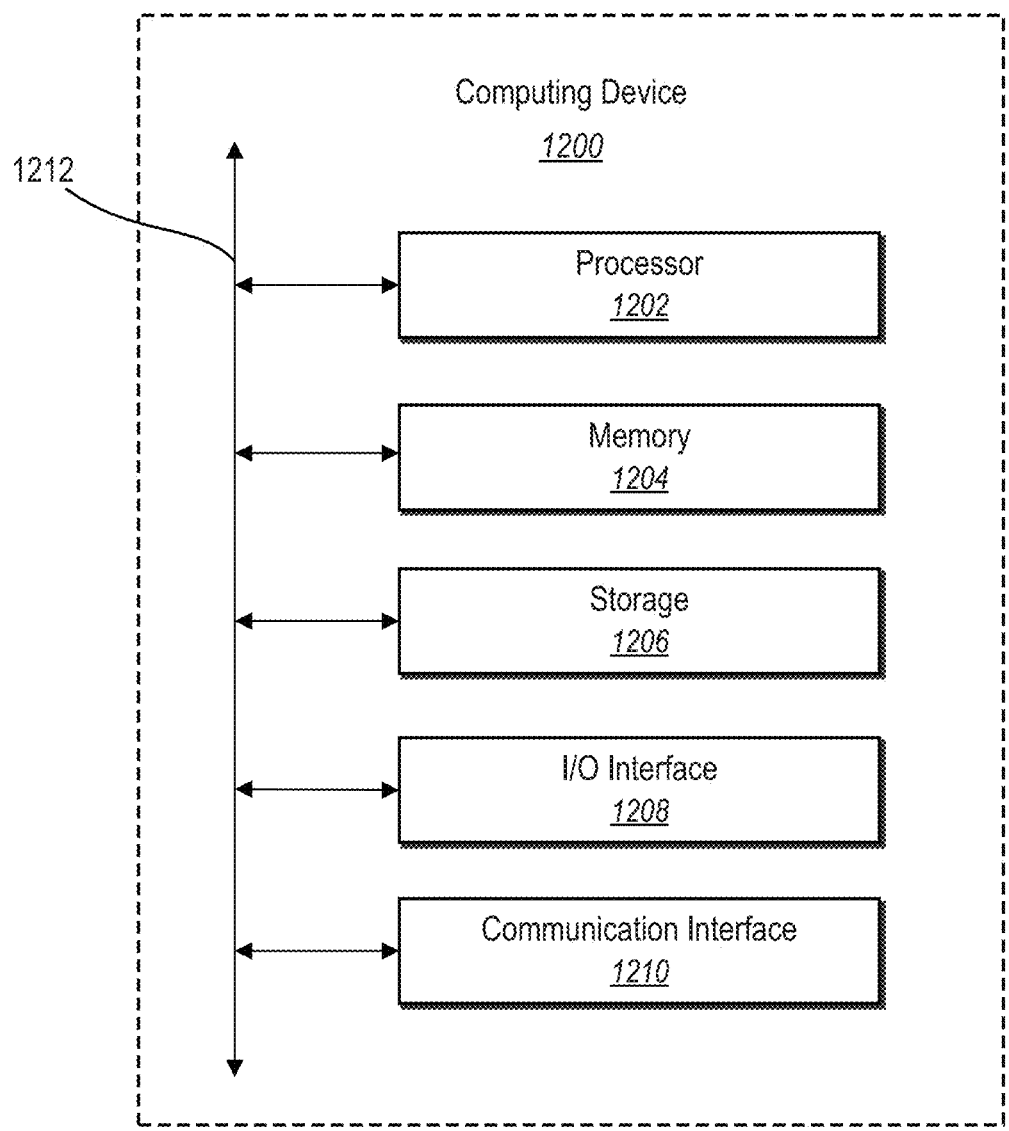
FIG. 12 illustrates a block diagram of an example computing device for implementing one or more embodiments of the present disclosure.

FIG. 12 illustrates a block diagram of an example computing device 1000 that may be configured to perform one or more of the processes described above. One will appreciate that one or more computing devices, such as the computing device 1200 may represent the computing devices described above (e.g., computing device 1000, server device(s) 102, and client device 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by at least one processor, cause the at least one processor to perform operations comprising:
   receiving a request to transfer a global style from a source digital image to a target digital image;
   identifying, in response to receiving the request to transfer, at least one target object within the target digital image;
   generating an intermediate target digital image by replacing the at least one target object within the target digital image with a content fill generated based on content of the target digital image surrounding the at least one target object; and
   transferring, utilizing a style transfer neural network, the global style from the source digital image to the intermediate target digital image while maintaining spatial features of the intermediate target digital image to generate a modified digital image.

2. The non-transitory computer-readable medium of claim 1, wherein identifying the at least one target object within the target digital image comprises utilizing an object detection machine learning model to identify at least one foreground object within the target digital image.

3. The non-transitory computer-readable medium of claim 1, further comprising instructions, which when executed by the at least one processor, cause the at least one processor to perform operations comprising extracting the at least one target object from within the target digital image utilizing a segmentation model.

4. The non-transitory computer-readable medium of claim 3, further comprising instructions, which when executed by the at least one processor, cause the at least one processor to perform operations comprising:
   generating, in response to extracting the at least one target object from within the target digital image, the content fill for a hole corresponding to the at least one target object; and
   filling the hole corresponding to the at least one target object with the content fill.

5. The non-transitory computer-readable medium of claim 1, further comprising instructions, which when executed by the at least one processor, cause the at least one processor to perform operations comprising:
   identifying, in response to receiving the request to transfer, at least one source object within the source digital image;
   extracting the at least one source object from within the source digital image to generate an intermediate source digital image; and generating the modified digital image by transferring the global style from the intermediate source digital image to the target digital image.

6. The non-transitory computer-readable medium of claim 3, wherein generating the modified digital image further comprises reinserting the at least one target object into the intermediate target digital image in response to transferring the global style.

7. The non-transitory computer-readable medium of claim 6, wherein generating the modified digital image further comprises harmonizing the reinserted at least one target object with a background portion of the intermediate target digital image adjacent to the reinserted at least one target object.

8. The non-transitory computer-readable medium of claim 1, wherein transferring the global style from the source digital image to the intermediate target digital image further comprises:
  extracting, utilizing an encoder neural network, a global code from the source digital image comprising features corresponding to an overall appearance of the source digital image;
  extracting, utilizing the encoder neural network, a spatial code from the intermediate target digital image corresponding to a geometric layout of the intermediate target digital image; and
  generating, utilizing a generator neural network, the modified digital image by combining the global code of the source digital image with the spatial code of the intermediate target digital image.

9. A computer-implemented method comprising:
  receiving a request to transfer a global style from a source digital image to a target digital image;
  replacing, in response to receiving the request to transfer, at least one target object within the target digital image with a content fill generated based on content of the target digital image surrounding the at least one target object to generate a first intermediate digital image;
  transferring, utilizing a style transfer neural network, the global style from the source digital image to the first intermediate digital image to generate a second intermediate digital image excluding the at least one target object while including spatial features of the target digital image in the global style from the source digital image; and
  inserting the at least one target object into the second intermediate digital image to generate a modified digital image.

10. The computer-implemented method of claim 9, wherein the global style comprises a landscape texture within the source digital image.

11. The computer-implemented method of claim 9, wherein the request to transfer comprises a selection of the at least one target object for extraction from within the target digital image.

12. The computer-implemented method of claim 9, further comprising utilizing a segmentation model to extract the at least one target object from within the target digital image.

13. The computer-implemented method of claim 12, wherein generating the first intermediate digital image further comprises generating, utilizing a content aware fill machine learning model, the content fill for a hole corresponding to the extracted at least one target object.

14. The computer-implemented method of claim 9, wherein transferring the global style from the source digital image to the target digital image further comprises:
  extracting, utilizing an encoder neural network, a global code from the source digital image comprising features corresponding to an overall appearance of the source digital image;
  extracting, utilizing the encoder neural network, a spatial code from the first intermediate digital image corresponding to a geometric layout of the first intermediate digital image; and
  combining, utilizing a generator neural network, the global code with the spatial code to generate the second intermediate digital image.

15. The computer-implemented method of claim 9, wherein generating the modified digital image further comprises harmonizing the inserted at least one target object with a background portion of the second intermediate digital image adjacent to the at least one target object.

16. A system comprising:
  one or more memory devices comprising a source digital image, a target digital image, a segmentation model, a content fill model, and a style transfer neural network; and
  one or more processors configured to cause the system to:
    extract, utilizing the segmentation model, at least one target object from the target digital image to generate a first intermediate digital image;
    generate, based on content of the target digital image surrounding the at least one target object, a content fill replacing the at least one target object within the first intermediate digital image;
    transfer, utilizing the style transfer neural network, a global style from the source digital image to the first intermediate digital image to generate a second intermediate digital image excluding the at least one target object while including spatial features of the target digital image in the global style from the source digital image; and
    insert the at least one target object into the second intermediate digital image to generate a modified digital image.

17. The system of claim 16, wherein the one or more processors are further configured to cause the system to identify the at least one target object to be extracted from the target digital image utilizing an object detection machine learning model.

18. The system of claim 16, wherein the one or more processors are further configured to cause the system to:
  identify at least one source object in the source digital image, the at least one source object comprising a different style than the global style of the source digital image;
  modify the source digital image by extracting, utilizing the segmentation model, the at least one source object from within the source digital image and generating the content fill for a hole corresponding to the extracted at least one source object; and
  in response to modifying the source digital image, transfer the global style from the source digital image to the first intermediate digital image to generate the modified digital image.

19. The system of claim 16, wherein transferring the global style from the source digital image to the target digital image further comprises:
  extracting, utilizing an encoder neural network, a global code from the source digital image comprising features corresponding to an overall appearance of the source digital image;

extracting, utilizing the encoder neural network, a spatial code from the target digital image corresponding to a geometric layout of the target digital image; and generating, utilizing a generator neural network, the modified digital image by combining the global code of the source digital image with the spatial code of the target digital image.

20. The system of claim 16, wherein the one or more processors are further configured to cause the system to generate the modified digital image by harmonizing, utilizing a harmonization neural network, the inserted at least one target object with a background of the second intermediate digital image adjacent to the at least one target object.

* * * * *